US006499559B2

(12) United States Patent
Mc Cann et al.

(10) Patent No.: US 6,499,559 B2
(45) Date of Patent: Dec. 31, 2002

(54) METHOD AND SYSTEM FOR IMPROVING MOTOR VEHICLE STABILITY INCORPORATING AN ELECTRIC POWER STEERING SYSTEM

(75) Inventors: Roy Alan Mc Cann, Saginaw, MI (US); Aly Ahmed Badawy, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/752,299

(22) Filed: Dec. 29, 2000

(65) Prior Publication Data

US 2001/0041957 A1 Nov. 15, 2001

Related U.S. Application Data

(60) Provisional application No. 60/173,599, filed on Dec. 29, 1999.

(51) Int. Cl.$^7$ ................................................ B62D 5/04
(52) U.S. Cl. ........................ 180/446; 701/41; 701/42
(58) Field of Search ........................... 180/443, 444, 180/446; 701/41, 42; 700/44, 45, 46, 63

(56) References Cited

U.S. PATENT DOCUMENTS

| | | | |
|---|---|---|---|
| 4,875,540 A | | 10/1989 | Oshita et al. ............... 180/79.1 |
| 4,925,312 A | * | 5/1990 | Onaga et al. ................ 700/261 |
| 5,198,981 A | | 3/1993 | Collier-Hallman et al. ...... 364/424.05 |
| 5,332,300 A | | 7/1994 | Hartman et al. ............ 303/100 |
| 5,435,729 A | * | 7/1995 | Hildreth et al. ............. 434/365 |
| 5,448,481 A | | 9/1995 | Asanuma et al. ....... 364/324.05 |
| 5,448,482 A | | 9/1995 | Yamamoto et al. .... 364/424.05 |
| 5,480,219 A | | 1/1996 | Kost et al. .................... 303/146 |
| 5,481,457 A | * | 1/1996 | Yamamoto et al. ........... 701/41 |
| 5,528,497 A | * | 6/1996 | Yamamoto et al. ........... 701/41 |
| 5,623,409 A | | 4/1997 | Miller .................. 364/424.051 |
| 5,668,721 A | | 9/1997 | Chandy ........................ 701/41 |
| 5,703,775 A | * | 12/1997 | Yamamoto et al. ........... 701/41 |
| 5,717,590 A | | 2/1998 | Mihalko .............. 364/424.051 |
| 5,732,377 A | | 3/1998 | Eckert ......................... 701/426 |
| 5,732,379 A | | 3/1998 | Eckert et al. .................. 701/83 |
| 5,735,584 A | | 4/1998 | Eckert ......................... 303/140 |
| 5,774,819 A | | 6/1998 | Yamamoto et al. ........... 701/41 |
| 5,774,821 A | | 6/1998 | Eckert ......................... 701/78 |
| 5,845,222 A | * | 12/1998 | Yamamoto et al. ........... 701/41 |
| 5,862,503 A | | 1/1999 | Eckert et al. .................. 701/78 |
| 5,991,675 A | * | 11/1999 | Asanuma ..................... 701/41 |
| 6,018,691 A | * | 1/2000 | Yamamoto et al. ........... 701/41 |
| 6,091,214 A | | 7/2000 | Yamawaki et al. ........... 318/52 |
| 6,154,696 A | | 11/2000 | Nishi et al. .................. 701/41 |

OTHER PUBLICATIONS

*Robust Control: The Parametric Approach*, Prentice Hall, 1995. by S. Bhattacharyya, H. Chapellat, L. Keel, pp. 72–73, 434–435.

"Method of Improving Motor Vehicle Stability Incorporating an Electric Power Steering System," Aug. 31, 1998. by Roy McCann and Aly Badawy.

"Variable Effort Steering for Vehicle Stability Enhancement Using an Electric Power Steering System," *Society of Automotive Engineers, Inc.*1998. by Roy McCann.

* cited by examiner

Primary Examiner—Daniel G. DePumpo
Assistant Examiner—Daniel Yeagley
(74) *Attorney, Agent, or Firm*—Edmund P. Anderson

(57) ABSTRACT

A method and system for stabilizing a vehicle employing an electric power steering system is disclosed. The method includes receiving as inputs, a desired torque command representative of a steering wheel torque and a vehicle speed signal. The method also includes acquiring an acceleration signal representative of vehicle acceleration. The method further comprises generating an assist torque command, which is a combination of the desired torque command and a compensating torque command where the compensating torque command is responsive to the vehicle speed signal and the acceleration signal.

40 Claims, 13 Drawing Sheets

Block Diagram of Invention ns, drawings, and
appended claims.

METHOD AND SYSTEM FOR IMPROVING MOTOR VEHICLE STABILITY INCORPORATING AN ELECTRIC POWER STEERING SYSTEM

CROSS-REFERENCE TO RELATED APPLICATIONS

This application is based upon, and claims the benefit of, United States Provisional Patent Application No. 60/173,599, filed Dec. 29, 1999, the disclosure of which are incorporated by reference herein in its entirety.

BACKGROUND

This application relates to systems for stabilizing electric power steering systems, such as in the automotive arts.

Steering equipment for assisting a driver to steer an automobile is well known in the art. In conventional steering assemblies, the operator controls the direction of the vehicle with the aid of a steering wheel mechanically connected, usually through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

Because the steering wheel is connected directly to the road wheels, the resulting mechanical assembly that provides the connection can be quite complicated and expensive to produce. The one advantage in having a direct connection is that the operator receives tactile feedback through the steering wheel. For example, if the vehicle changes directions while it is moving, the operator will feel resistance in the steering wheel.

It is known in the art of electric power steering systems to vary the amount of assist, or commanded torque, as a function of vehicle speed, handwheel position, and handwheel torque. However, the previous systems may be inadequate under certain adverse road conditions, such as wet or icy roads.

Therefore, is it considered advantageous to provide an electric steering control system that provides desirable assist torque and tactile feedback to the operator and yet maintains system stability under adverse road conditions.

BRIEF SUMMARY

A method of stabilizing a vehicle employing an electric power steering system is disclosed. In addition, a system, which implements the method is also disclosed. The method includes receiving as inputs, a desired torque command representative of a steering wheel torque desired in the electric power steering system and a vehicle speed signal representative of a forward speed of the vehicle. The method also includes acquiring an acceleration signal representative of the vehicle acceleration measured by an acceleration sensor.

The method further comprises generating an assist torque command, which is a combination of the desired torque command and a compensating torque command where the compensating torque command is responsive to the vehicle speed signal and the acceleration signal. The assist torque command is transmitted to an assist mechanism for application of an assist torque to the vehicle steering system.

The above-described and other features and advantages will be appreciated and understood by those skilled in the art from the following detailed description, drawings, and appended claims.

BRIEF DESCRIPTION OF THE DRAWINGS

For a further understanding of the nature of the disclosed embodiments, as well as other features and advantages thereof, reference should be made to the following detailed description taken in conjunction with the accompanying drawings, which are meant to be exemplary and therefore not limiting, and wherein like elements are numbered alike in the several figures.

DETAILED DESCRIPTION

Figure 2:
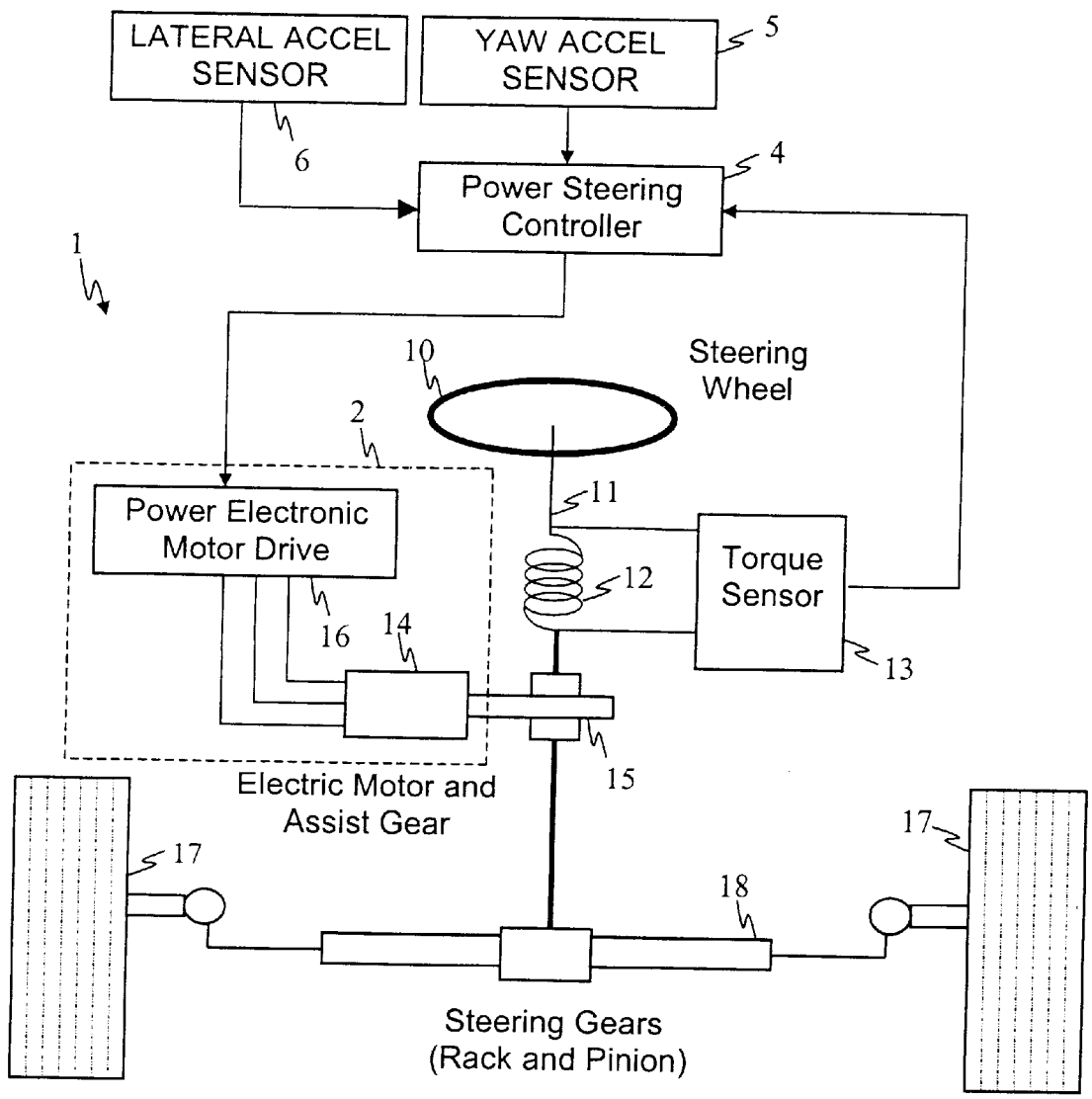
FIG. 2 is a typical electric power assisted steering system (EPS)
Figure 4:
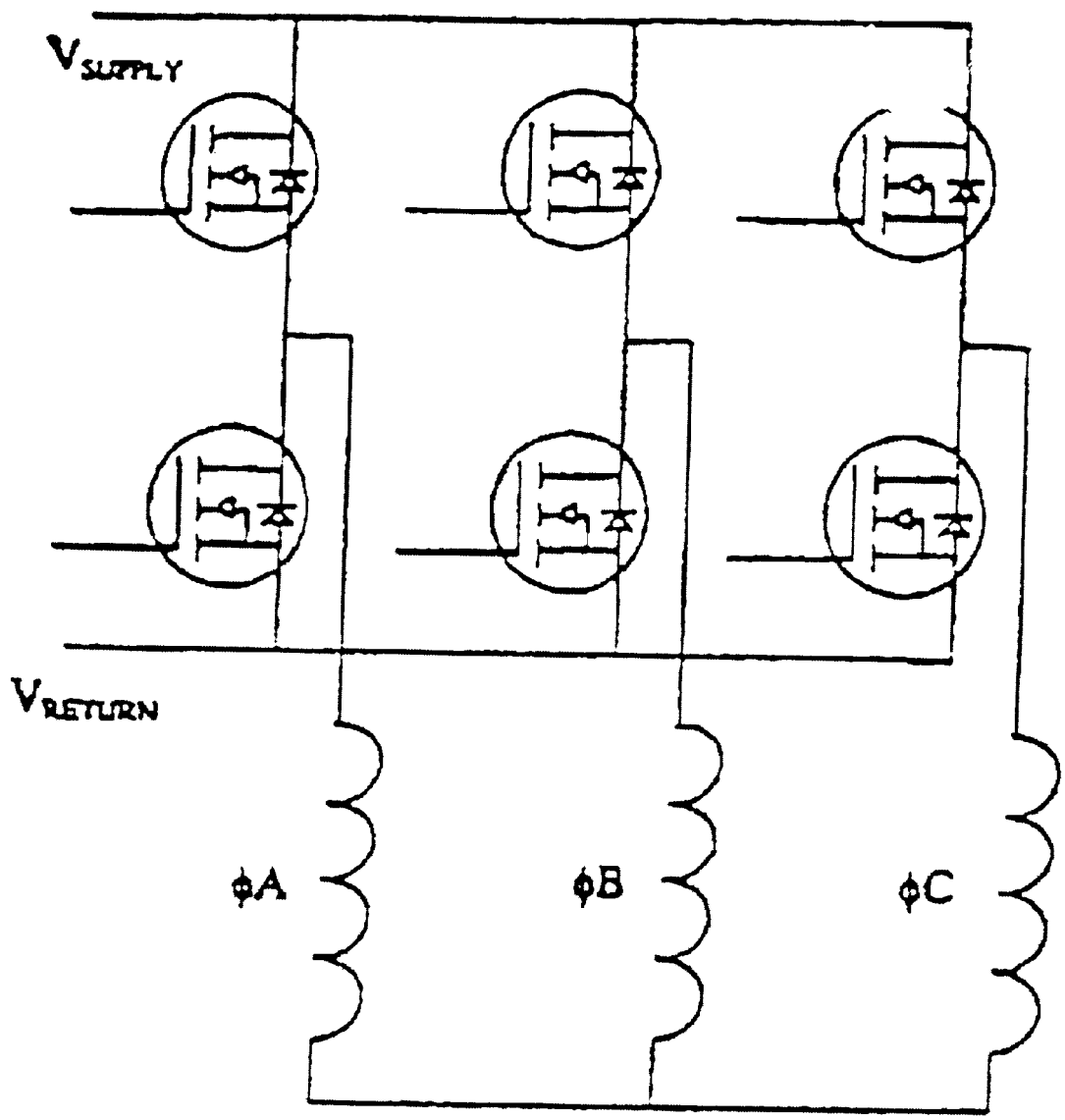
FIG. 4 is a schematic of a suitable three-phase inverter for use with the invention.

FIG. 2 is a diagrammatic representation of an enhanced electric power steering (EPS) system 1. Depicted is a steering wheel 10 and a steering column 11 having a torsion bar 12 or equivalent and a torque sensor 13 that detects and measures the torque applied to the steering wheel 10 by measuring the deflection of the torsion bar 12. A steering wheel torque signal proportional to the torque applied to the steering wheel 10 is transmitted to a controller 4. A first acceleration sensor and a second acceleration sensor are employed to detect vehicle accelerations. A yaw acceleration signal denoted $\dot{r}$ is measured and detected by a yaw acceleration sensor 5 and transmitted to controller 4. Likewise, a lateral acceleration signal denoted $\dot{v}$ is measured and detected by a lateral acceleration sensor 6 and transmitted to controller 4. The controller 4 uses the information to send a command torque signal to an EPS assist mechanism 2, which usually comprises an electric motor 14 and gearing 15 to transmit power from the electric motor 14 to the steering column 11, and a motor drive 16. The motor drive 16 will usually be an inverter, preferably a three-phase inverter, such as shown in FIG. 4. The combined torque of the driver and the power assist will impart force to one or more steerable road wheels 17, usually through a rack 18.

Disclosed herein is a system for and method of computing and asserting an assist torque command $\tau_{cmd}$ in an EPS 1 to augment the stability of the driver-vehicle system. The system and method are particularly beneficial for improving vehicle response on wet or icy road surfaces with reduced road surface friction coefficients. The assist torque command is generated in accordance with the basic functional formula $$\tau_{cmd} = f_1(u, \theta_h, \tau_h) + f_2(u, v, dv/dt, r, dr/dt)$$

where; u=vehicle speed; $\theta_h$=hand or steering wheel position; $\tau_h$=hand or steering wheel torque; v=lateral velocity; dv/dt= $\dot{v}$=lateral translational acceleration, termed lateral acceleration; r=yaw rate; and dr/dt=$\dot{r}$=yaw angular acceleration, termed yaw acceleration. It is noteworthy to recognize that $f_1$ represents the contribution to the $\tau_{cmd}$ associated with generating the desired assist torque (not a subject of this disclosure), while $f_2$ represents the contribution to the $\tau_{cmd}$ associated with generating the stabilizing damping torque command.

The present invention may be utilized in various types of vehicles employing electric steering systems. A preferred embodiment of the invention, by way of illustration is described herein as it may be applied to an automobile employing an electric steering system. While a preferred embodiment is shown and described by illustration and reference to an automobile steering system, it will be appreciated by those skilled in the art that the invention is not limited to the automobiles alone by may be applied to all vehicles employing electric steering systems.

Figure 1A:
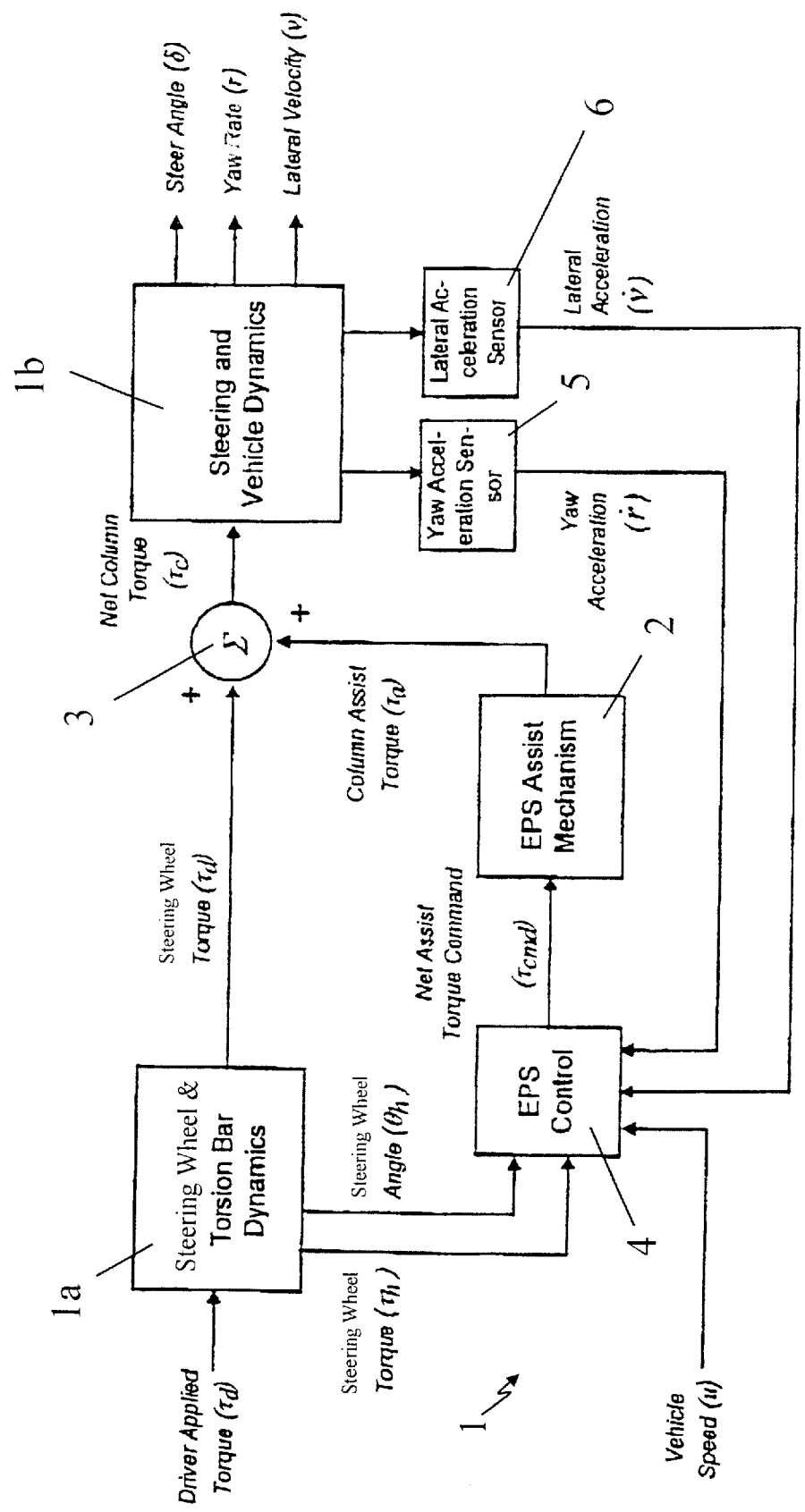
FIG. 1A is a block diagram of the invention.
Figure 1B:
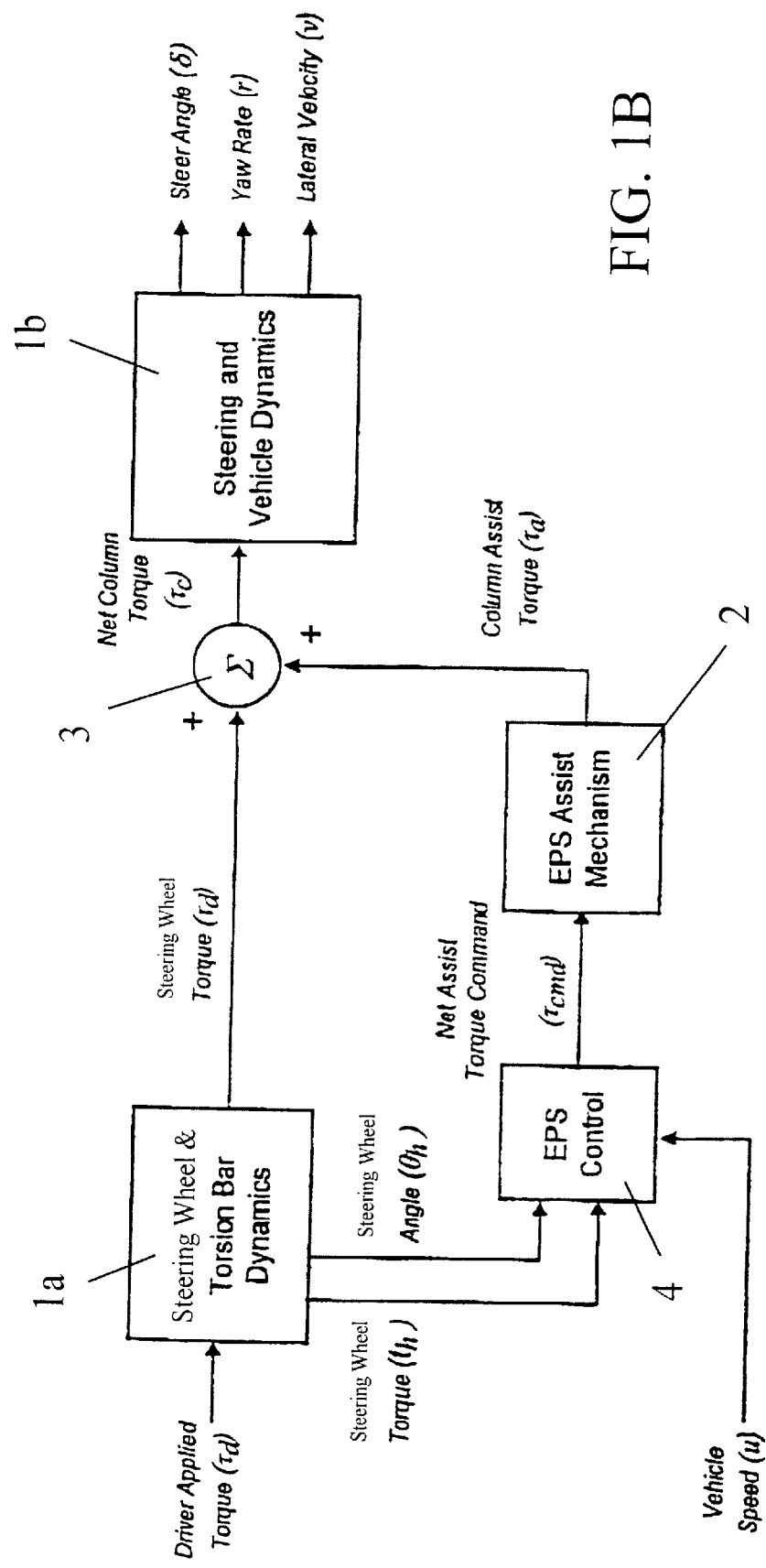
FIG. 1B is a block diagram of the prior art.

Referring to FIGS. 1A and 1B, an embodiment of the invention is depicted as an electric power steering (EPS) system 1 enhancement as shown in FIG. 1A. For comparison and discussion, a prior art system shown in FIG. 1B. As can be seen, both systems include common elements such as: a steering wheel and torsion bar dynamics block 1a comprising; a steering wheel 10, steering column, 11, torsion bar 12 and torque sensor 13. Both systems further include a steering and vehicle dynamics block 1b comprising: one or more steerable road wheels 17, steerable in response to application of torque to the steering wheel 10 by a driver of a vehicle. A "torsion bar" 12 is a device for measuring the torque 13 applied to the steering wheel by the driver of the vehicle, which is well known in the automotive art. Another common element to both systems is a steering wheel position sensor (not shown). The steering wheel position sensor detects and measures steering wheel position and transmits a steering wheel position signal representative of the steering wheel position to controller 4. Yet another element in common to both systems is a vehicle speed sensor (not shown). The vehicle speed sensor detects and measures vehicle speed and transmits a vehicle speed signal representative of the vehicle forward speed to controller 4.

In addition, common to both systems is an assist mechanism 2 that delivers the assist torque $\tau_a$. Typically, an electric motor 14 is employed, though other electrical devices, such as solenoids, could be used. The steering wheel torque $\tau_d$ exerted by the driver and the assist torque $\tau_a$ provided by the assist mechanism 2 are combined at node 3 to produce the net torque command $\tau_c$ to the steering and vehicle dynamics 1b.

In addition, common to both the prior art and the invention as embodied is a controller 4, which receives various system inputs and controls used to generate the torque command $\tau_{cmd}$ delivered to the assist mechanism 2. The assist mechanism 2 generates an assist torque $\tau_a$ responsive to this torque command $\tau_{cmd}$. The assist torque $\tau_a$ is combined with the steering wheel torque $\tau_d$ at node 3. It will be appreciated, that the steering wheel dynamics block 1a, controller 4, steering and vehicle dynamics block 1b, and assist mechanism 2 are described for illustrative purposes. The processing performed and functionality throughout the enhanced electric power steering system 1 may be distributed in a variety of manners. For example, distributing the processing performed in the controller 4 among the other processes or components illustratively employed may eliminate the need for such a component or process as described. In addition, each of the systems or components may have additional functionality that will be described in more detail herein as well as include functionality and processing ancillary to the disclosed invention, which requires no further mention. As used herein, signal connections may physically take any form capable of transferring a signal, including electrical, optical, or radio and the like.

Unique to the embodiment of FIG. 1A are addition of the two acceleration sensors. A first acceleration sensor typically embodied as a yaw acceleration sensor 5 measures yaw acceleration denoted $\dot{r}$. A second acceleration sensor typically embodied as a lateral acceleration sensor 6 measures lateral acceleration denoted $\dot{v}$ of the vehicle. Signals representative of the yaw acceleration $\dot{r}$ and lateral acceleration $\dot{v}$ are transmitted to the controller 4. Hence, the controller 4 of the invention differs from that of the prior art in that it must be adapted to receive the yaw and lateral accelerations as inputs and process the information to calculate a commanded assist torque. Controller 4 may typically include, without limitation, a processor, logic, memory, storage, registers, timing, interrupts, and the like as required to perform the processing and functions prescribed by the invention. Controller 4 may further include such communication and input/output signal interfaces and conversion capability as required for interfacing to other system components and interfaces. For example, controller 4 may include signal input signal filtering to enable accurate sampling and conversion or acquisitions of such signals from communications interfaces. Additional features of controller 4 and the processes therein are discussed in detail at a later point herein.

As stated earlier a method and system are disclosed for enhancing the control functions of the prior art systems to include maintaining the stability of the system under adverse driving conditions. To appreciate the features of the invention it is necessary to gain some familiarity with the mathematics representing the dynamic characteristics of the vehicle. To that end, a derivation is provided based on a one-track model for the dynamics of a steerable vehicle. It may be appreciated that via simulation of such a dynamic model, an evaluation of the dynamic characteristics may be completed. From such a simulation, the stability characteristics of the vehicle will be evaluated for varying operating conditions.

Figure 3:
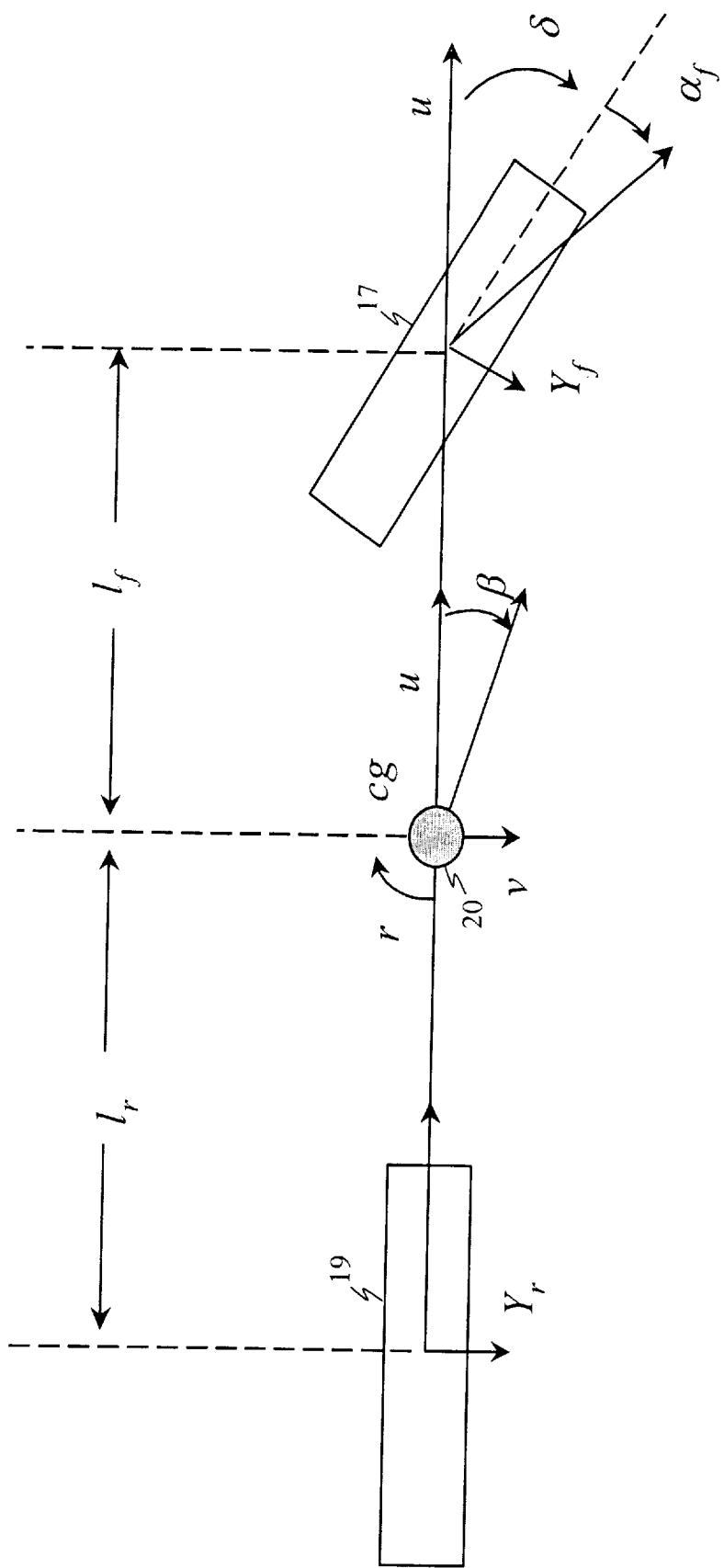
FIG. 3 is a diagram of the single-track model used in the invention.

FIG. 3 depicts a basic one-track model from which the theory for generating and controlling the electronic power steering assist is derived. In the model, the one or more steerable road wheels 17 and the fixed road wheels 19 are lumped together for analysis purposes on the vehicle centerline. The vehicle center of gravity 20 is denoted by cg. The distance from the center of gravity cg 20 to the front $l_f$ and rear $l_r$ axles is a design variable and is generally determined by the vehicle manufacturer. It is at this location that the acceleration sensor is most likely to be placed. In an implementation, a yaw and lateral acceleration sensor are placed at the cg 20. However, in most applications, other design constraints may dictate that the sensors may not be placed at the exact cg 20. For instance, the cg 20 may reside in a physical location that prohibits the placement of the sensors at that location. Further, the placement of other components and systems may dictate that the location is not available for location of the sensors. Last, placement location of the sensors may be determined by specific sensor signal characteristics. For example, placement at one location may yield improved signal quality relative to another location, while a different location may exhibit enhanced signal versus noise characteristics. In an embodiment of the invention, the sensors are placed on or near the centerline of the vehicle in the vicinity of the real axle of the vehicle. The sensor output signals are then compensated utilizing well-known principles for their geometric offsets from the cg 20 of the vehicle.

Returning now to FIG. 3 and the derivations, for a deflection of the steerable wheel 17 by an angle $\delta$, there is an associated rate of yaw r(t) and rate of lateral displacement v(t) of the center of gravity 20. For simplicity, r(t) will be represented by r and v(t) by v. It is apparent that r and v are interrelated. The interrelationship may be described by the equations:

$$\frac{dv}{dt} = -\left(\frac{C_f + C_r}{mu}\right)v + \left(\frac{C_r l_r - C_f l_f}{mu} - u\right)r + \left(\frac{C_f}{m}\right)\delta \quad (4)$$

$$\frac{dr}{dt} = \left(\frac{C_r l_r - C_f l_f}{J_c u}\right)v - \left(\frac{C_r l_r^2 + C_f l_f^2}{J_c u}\right)r + \left(\frac{C_f l_f}{J_c}\right)\delta \quad (5)$$

where $C_f$ and $C_r$ are the front and rear tire cornering coefficients and u is the forward component of the vehicle velocity. The coefficients are defined to be positive and are related to the front $-Y_f$ and rear $-Y_r$ lateral tire forces as follows:

$$-Y_f = C_f \alpha_f \quad (3a)$$

$$-Y_r = C_r \alpha_r \quad (3b)$$

where $\alpha_f$ and $\alpha_r$ are the front and rear slip angles.

The dynamics of the steering angle $\delta$ are modeled as follows:

$$\frac{d\delta}{dt} = \omega\delta \quad (4a)$$

$$\frac{d\omega\delta}{dt} = \left(\frac{C_f d}{J_M u}\right)v + \left(\frac{C_f l_f d}{J_M u}\right)r - \left(\frac{C_f d}{J_M} + \frac{G_K G_{SC} K_{TB}}{J_M}\right)\delta - \left(\frac{G_K B_{TB} G_{SC} + b_f}{J_M}\right)\omega\delta + \left(\frac{K_{TB} G_K}{J_M}\right)\theta_h + \left(\frac{B_{TB} G_K}{J_M}\right)\omega_h + \left(\frac{\eta\frac{\sqrt{3}}{2}K_V G_K G_{MC}}{J_M}\right)i_q \quad (4b)$$

where d is the castor angle offset distance at the front tires and $J_M$ is the moment of inertia of the steering system at the front tire steering axis. $G_K$, $G_{SC}$, and $G_{MC}$ are the mechanical constants relating steering column to front tire torque gain, steering column to front tire angle ratio, and assist motor to steering column gear ratio, respectively. Viscous losses associated with the steering gear and ball joints are denoted by $b_f$. The last term in Equation (4b) is the torque applied to the steering column by the assist motor and gear mechanism. The assist gear efficiency is $\eta$ and $K_v$ is the line-to-line generated voltage constant. $K_{TB}$ and $B_{TB}$ are torsion bar spring and damping constants. The torque sensor measures the angular difference between the handwheel angle $\theta_h$ and the steering angle $\delta$ referenced to the steering column. For instance, normally the steering wheel angle $\theta_h$ and the steering angle $\delta$ will track one another proportionately, however, for a fixed steering angle $\delta$, if the steering wheel is rotated, the torsion bar will wind up and the torque sensor will detect this difference. The hand wheel dynamics are modeled as $$\frac{d\theta_h}{dt} = \omega_h \quad (5a)$$

$$\frac{d\omega_h}{dt} = \left(\frac{K_{TB} G_{SC}}{J_h}\right)\delta + \left(\frac{B_{TB} G_{SC}}{J_h}\right)\omega\delta - \left(\frac{K_{TB}}{J_h}\right)\theta_h - \left(\frac{B_{TB}}{J_h}\right)\omega_h + \frac{\tau_d}{J_h} \quad (5b)$$

where $\tau_d$ is the torque applied by the driver to the steering wheel. The motor is modeled as a three-phase sinusoidal machine with a permanent magnet rotor. Balanced three-phase voltages are applied to the motor terminals from an inverter, such as that depicted in FIG. 4. The phase variables are transformed to the rotor reference frame using the relationships $$\begin{bmatrix} i_q \\ i_d \end{bmatrix} = \frac{2}{3}\begin{bmatrix} \cos\theta_r & \cos\left(\theta_r - \frac{2\pi}{3}\right) & \cos\left(\theta_r + \frac{2\pi}{3}\right) \\ \sin\theta_r & \sin\left(\theta_r - \frac{2\pi}{3}\right) & \sin\left(\theta_r + \frac{2\pi}{3}\right) \end{bmatrix}\begin{bmatrix} i_a \\ i_b \\ i_c \end{bmatrix} \quad (6a)$$

$$\begin{bmatrix} v_q \\ v_d \end{bmatrix} = \frac{2}{3}\begin{bmatrix} \cos\theta_r & \cos\left(\theta_r - \frac{2\pi}{3}\right) & \cos\left(\theta_r + \frac{2\pi}{3}\right) \\ \sin\theta_r & \sin\left(\theta_r - \frac{2\pi}{3}\right) & \sin\left(\theta_r + \frac{2\pi}{3}\right) \end{bmatrix}\begin{bmatrix} v_a \\ v_b \\ v_c \end{bmatrix} \quad (6b)$$

where $\theta_r$ is the rotor position referenced to the north pole of the field induced in the air gap by the A-phase stator winding. The quadrature and direct axis current variables $i_q$ and $i_d$ are modeled as $$\frac{di_q}{dt} = -\left(\frac{R}{L}\right)i_q - \left(\frac{\lambda_m}{L} + i_d\right)\omega_r + \frac{v_q}{L} \quad (7a)$$

$$\frac{di_d}{dt} = -\left(\frac{R}{L}\right)i_d + \omega_r i_q + \frac{v_d}{L} \quad (7b)$$

where R and L are the motor phase resistance inductance, respectively and $\lambda_m$ is the peak flux linked by the motor phase A stator coil from the rotor magnet field. $\lambda_m$ is related to the line-to-line generated voltage constant $K_v$ and motor electrical torque by $$K_v = \sqrt{3}\lambda_m \quad (8a)$$

$$T_e = \frac{3}{2}\lambda_m i_q \quad (8b)$$

The quadrature axis voltage $v_q$ is the controlled variable. As a simple example, one possible controller realization of FIG. 1*a* could include derivative feedback of the yaw rate and lateral velocity measurements:

$$v_q = C_q(\theta_h - G_{sc}\delta) - C_v \frac{dv}{dt} - C_r \frac{dr}{dt} \qquad (9)$$

A rudimentary field-weakening scheme is implemented by varying the direct axis voltage with respect to the motor velocity $\omega_r$ as $$v_d = C_d \omega_r \qquad (10)$$

Field weakening expands the available torque-speed envelope of an electric motor by advancing the applied voltage phase angle with respect to the motor position.

One feature of the disclosed embodiment is to provide a means to implement variable effort steering techniques. Variable effort steering varies the amount of assist torque in response to changing driving conditions. For example, at low vehicle speeds the amount of assist torque is maximized to reduce the amount of handwheel torque needed for parking lot maneuvers. At highway speeds, the assist torque is reduced to stabilize the vehicle response to lane change maneuvers. Braking systems have been introduced into the marketplace, which use yaw and lateral acceleration sensors for stability enhancement during emergency braking conditions. In an embodiment of the invention, these sensors are employed to improve vehicle-handling characteristics by providing yaw acceleration $\dot{r}$, and lateral acceleration $\dot{v}$ feedback signals to an electric power steering system 1 with variable effort steering assist.

Eigenvalue Stability Analysis

The use of yaw and lateral acceleration feedback in an electric power steering system 1 often improves vehicle-handling characteristics. However, feedback, and therefore any closed loop system poses stability questions given the wide range of parameter variation typically encountered in practice for a system 1 such as modeled in the above mentioned descriptions. Therefore, a consideration is provided addressing the impact of parameter variations on the closed loop stability of an electric power steering system 1. The stability analysis provided provides a mathematically illustrated exemplary understanding of the benefits of the preferred embodiment.

State Space Description of Linearized System

The electric power steering system 1 as stated earlier may be represented by mathematical equations, namely equations (1), (2), (4a–b), (5a–b), and (7a–b). The equations are linearized and expressed in state space form as $$\frac{d}{dt}\begin{bmatrix} v \\ r \\ \delta \\ \omega_\delta \\ \theta_h \\ \omega_h \\ i_q \\ i_d \end{bmatrix} = \begin{bmatrix} a_{11} & a_{12} & a_{13} & 0 & 0 & 0 & 0 & 0 \\ a_{21} & a_{22} & a_{23} & 0 & 0 & 0 & 0 & 0 \\ 0 & 0 & 0 & 1 & 0 & 0 & 0 & 0 \\ a_{41} & a_{42} & a_{43} & a_{44} & a_{45} & a_{46} & a_{47} & 0 \\ 0 & 0 & 0 & 0 & 0 & 1 & 0 & 0 \\ 0 & 0 & a_{63} & a_{64} & a_{65} & a_{66} & 0 & 0 \\ a_{71} & a_{72} & a_{73} & a_{74} & a_{75} & 0 & a_{77} & a_{78} \\ 0 & 0 & 0 & a_{84} & 0 & 0 & a_{87} & a_{88} \end{bmatrix}\begin{bmatrix} v \\ r \\ \delta \\ \omega_\delta \\ \theta_h \\ \omega_h \\ i_q \\ i_d \end{bmatrix} \qquad (11)$$

where the input driver torque $\tau_d$ is assumed to be zero. The system of equations may be written more compactly as $$\frac{dx}{dt} = Ax + B\tau_d \qquad (12)$$

where $\tau_d$ is the handwheel torque applied by the driver (as identified, for example, in Equation 5b) and the matrix A is the system matrix shown in Equation 11. The matrix B is the control matrix, which may be ignored based upon the assumption that the commanded input driver torque $\tau_d$ is zero.

Eigenvalues of the Parameterized System

Stability of the closed loop system may be determined by determination of the eigenvalues of the closed loop system matrix A. This is equivalent to finding the roots of the characteristic equation associated with A. The characteristic equation will have the general form $$s^8 + a_7 s^7 + a_6 s^6 + \ldots + a_1 s + a_0 = 0 \qquad (13)$$

where each of the coefficients is a multilinear function of the system matrix parameters in equation 11. The coefficients $a_7, \ldots, a_0$ of the general equation (13) were solved for as a function of the system matrix A parameters $a_{11}, a_{12}, \ldots, a_{88}$ employing the MATLAB® Symbolic Math toolbox. Each multilinear function contains numerous terms, which are not explicitly written here for simplicity. As an example, the eigenvalues of Equation 11 were identified with nominal parameter values yielding $-1000$ $-780 \pm j507$ $-44.1$ $-2.85 \pm j8.43$ $-6.11 \pm j4.29 \qquad (14)$ It will be appreciated that the solutions indicate that the eigenvalues are in the left half of the complex plane, thereby, confirming the stability of the electric power system 1.

Variations of the parameters in Equation 11 may lead to reduced stability margins. A common example occurs when the cornering coefficients $C_f$ and $C_r$ are reduced due to rain or ice on the road surface over which the vehicle is traveling. Typical wet road conditions may be exemplified by the reductions of the cornering coefficients $C_f$ and $C_r$ to 20 percent of their nominal values. Under these circumstances, the open loop system without the benefit of yaw and lateral acceleration feedback would exhibit a pair of eigenvalues in the right half complex plane and consequently be unstable. Employing the abovementioned feedback would yield a system of equations where the eigenvalues of the closed loop system of equations become $-1000$ $-783 \pm j506$ $-40.7$ $-0.2 + j4.9$ $-4.5$ $-1.8 \qquad (15)$ It is noteworthy to recognize and appreciate that although the stability margin has been reduced, the closed system remains stable despite the unstable open loop configuration of the system. With sensor feedback the motor drive of the electric power steering system is actively involved in the stabilization of the vehicle dynamics. Therefore, it is also important to consider the impact of motor drive parameter variation on the stability of the closed loop system. It will be appreciated by those skilled in the art, that the abovementioned stability analysis is illustrative and for the purposes of enhancing understanding of the concepts which led to the development of the preferred embodiment. It should be noted that verifying that the closed loop system is stable under all combinations of parameter variation is difficult and in general cannot necessarily be assured by evaluating discrete values taken at the extremes of allowable variation.

Stability Analysis With Large Parameter Uncertainty

For further illustration, a second method of stability analysis theory for systems of equations is given consideration. A brief overview of two relevant theorems is provided below. Additional details may be found in: *Robust Control: The Parametric Approach,* Prentice Hall, 1995. by S. Bhattacharyya, H. Chapellat, L. Keel, pp. 72–73, 434–435 for a more complete coverage of this topic.

Mapping Theorem

The coefficients of the characteristic Equation 13 are a multilinear function of the system matrix elements $a_{11}$, $a_{12}, \ldots, a_{88}$. Each of the matrix elements $a_{11}, a_{12}, \ldots, a_{88}$ is a function of parameters such as $C_f$, u, R and $\lambda_m$. The matrix elements $a_{11}, a_{12}, \ldots, a_{88}$ are each a member of a closed interval based on the range over which the system parameters vary. For example, if R varies with temperature over the range of 0.12 Ω to 0.20 Ω then $$a_{77} \in [-1333, -800]$$

$$a_{88} \in [-1333, -800]$$

Let $P=[p_1, p_2, \ldots, p_{27}]$ be the vector of the twenty-seven parameters a11, a12, . . . , a88 in the system matrix of Equation 11. The characteristic polynomial of Equation 13 may be written as $$\delta(s,P)=\delta_0(P)+\delta_1(P)s+\delta_2(P)s^2+\ldots+\delta_8(P)s^8 \quad (16)$$

where the coefficients $\delta_i(P)$ are multilinear functions of the elements of P. The vector P lies in an uncertainty set $$\Pi=\{P:p_i^- \leq p_i \leq p_i^+, i=1,2,3,\ldots,27\} \quad (17)$$

The corresponding set of multilinear interval polynomials is denoted by $$\Delta(s)=\{\delta(s,P):P\in\Pi\} \quad (18)$$

The set of polynomials which are combinations of the end-points of the intervals of Equation 18 are the vertices of Π.

$$V=\{P:p_i=p_i^+ \text{ or } p_i=p_i^-, i=1, 2, \ldots, 27\} \quad (19)$$

The set of vertex polynomials is defined as $$\Delta_v(s)=\{\delta(s,P):P\in V\}=\{v_1,v_2,\ldots,v_{2^{27}}\} \quad (20)$$

It is desired to determine if all the characteristic equations in the set $\overline{\Delta}(s)$ are stable. From the Mapping Theorem of Equation 11 it is known that the stability of the set $\Delta(s)$ can be determined from the stability the convex hull of the vertex polynomials $\Delta_v(s)$. The convex hull $\overline{\Delta}(s)$ is a set of polynomials defined as $$\overline{\Delta}(s) = \left\{ \sum_{i=1}^{i=2^{27}} \lambda_i v_i(s) : 0 \leq \lambda_i \leq 1, i=1, 2, \ldots, 2^{27} \right\} \quad (21)$$

The stability of $\overline{\Delta}(s)$ was evaluated by repeated application of the Segment Lemma to every pair-wise combination of vertex polynomials in $\Delta_v(s)$. The Segment Lemma provides a simple test of the stability of the polynomials along a line segment $v_u$ connecting two vertex polynomials in $\Delta_v(s)$. The polynomials which are members of a line segment are described as $$v_u=\{(1-\lambda)v_i+\lambda v_j:\lambda\in[0,1]\} \quad (22)$$

An arbitrary vertex polynomial will have the form $$v_i=v_{i0}+v_{i1}s+v_{i2}s^2+\ldots+v_{i8}s^8 \quad (23)$$

The following polynomials are defined from this vertex polynomial as $$v_i^d(\omega)=v_{i0}+v_{i2}\omega^2+v_{i4}\omega^4-v_{i6}\omega^6+v_{i8}\omega^8 \quad (24a)$$

$$v_i^o(\omega)=v_{i1}-v_{i3}\omega^2+v_{i5}\omega^4-v_{i7}\omega^6 \quad (24b)$$

The Segment Lemma asserts that if the end point polynomials $v_i$ and $v_j$ are stable with leading coefficients of the same sign, then every member of the set $v_{ij}$ defined in Equation 22 is stable if and only if there exists no real $\omega>0$ that simultaneously meets all of the following conditions:

$$v_i^e(\omega)v_j^o(\omega)-v_j^d(\omega)v_i^o(\omega)=0 \quad (25a)$$

$$v_i^d(\omega)v_j^d(\omega)\leq 0 \quad (25b)$$

$$v_i^o(\omega)v_j^o(\omega)\leq 0 \quad (25c)$$

Thus, the stability of a set of polynomials $\overline{\Delta}(s)$ may be determined by applying the Segment Lemma to every pair of polynomials in the set $\Delta_v(s)$. Consequently, from the Mapping Theorem, if every element of the set is stable then every element in $\Delta(s)$ is stable.

Vehicle Application Example

The vehicle response to a handwheel torque transient was simulated using MATLAB/SIMULINK®. Equations (1), (2), (4a–b), (5a–b), and (7a–b) were solved with and without yaw and lateral acceleration feedback. The driving conditions simulated correspond to a forward vehicle speed of 32 m/s (71 mph) on dry pavement. The parameter values used in the simulation were as identified in Table 1.

TABLE 1

Vehicle Parameter Values Simulated

| Parameter | Value |
| --- | --- |
| front cornering coefficient | $C_f$ = 140,000 N/radian |
| rear cornering coefficient | $C_r$ = 140,000 N/radian |
| distance CG to front axle | $l_f$ = 1.0 m |
| distance CG to rear axle | $l_r$ = 1.8 m |
| vehicle speed | u = 32 m/s |
| vehicle mass | m = 2,000 kg. |
| vehicle moment of inertia | $J_c$ = 3,000 Kg-m2 |
| caster angle offset distance | d = 0.100 m |
| steering moment at front tire | $J_s$ = 4.0 Kg-m2 |
| steering damping at front tire | $J_h$ = 0.15 Kg-m2 |
| torsion bar spring constant | $K_{TB}$ = 43 Nm/r |
| torsion bar damping constant | $B_{TB}$ = 4.0 Nm/r/s |
| motor line-line g.v. constant | $K_v$ = 0.027 V/r/s |
| motor resistance | R = 0.150 Ω |
| motor inductance | L = 150 µH |
| column to tire torque ratio | $G_K$ = 15 |
| column to tire angle ratio | $G_{SC}$ = 15 |
| motor to column gear ratio | $G_{MC}$ = 30 |
| assist gear efficiency | η = 0.70 |

Figure 5A:
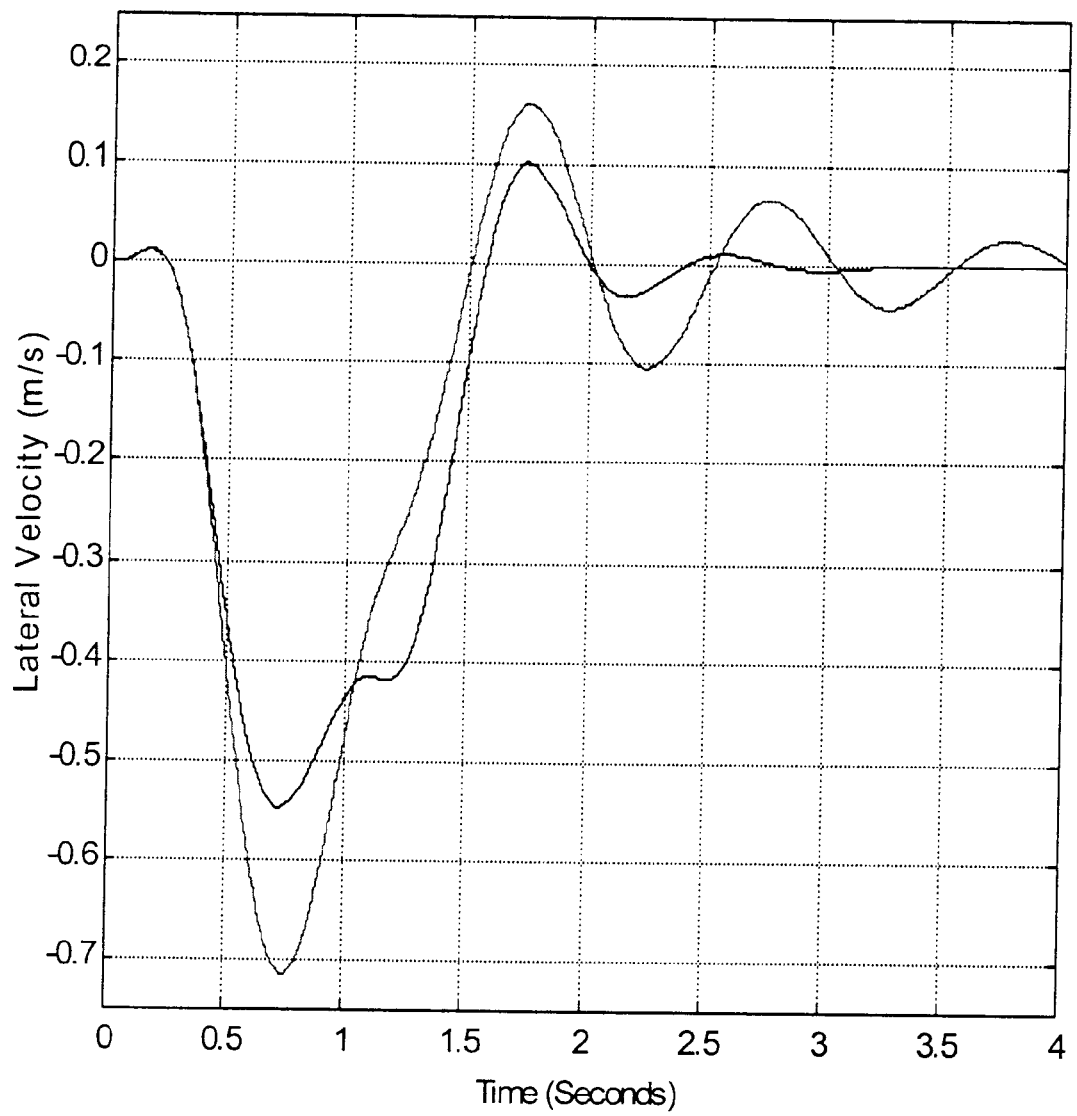
FIG. 5A shows superimposed graphs of lateral velocity response to a 1.0 second duration handwheel torque pulse with and without yaw and lateral acceleration feedback.
Figure 5B:
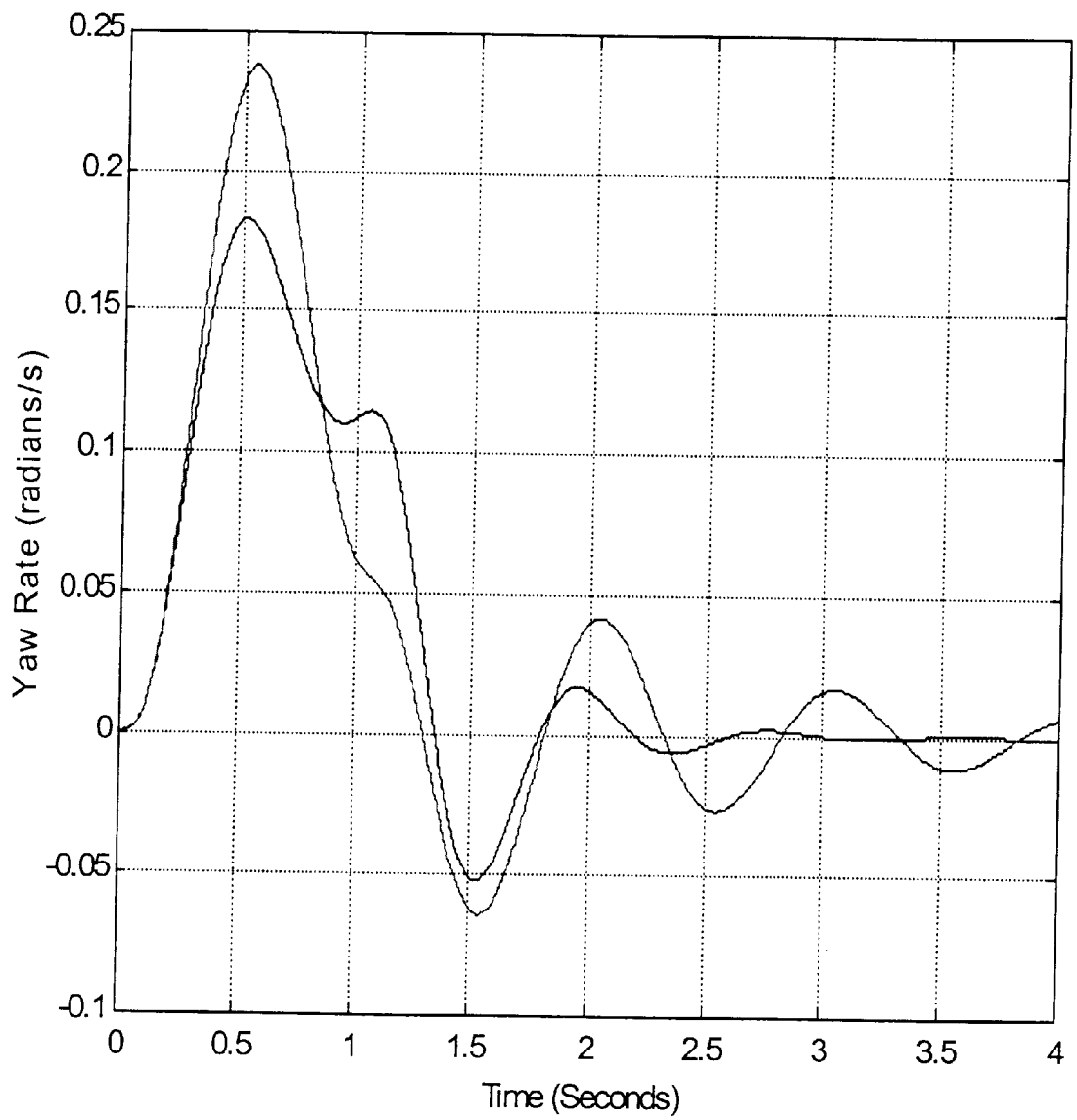
FIG. 5B shows superimposed graphs of yaw rate response to a 1.0 second duration handwheel torque pulse with and without yaw and lateral acceleration feedback.
Figure 5C:
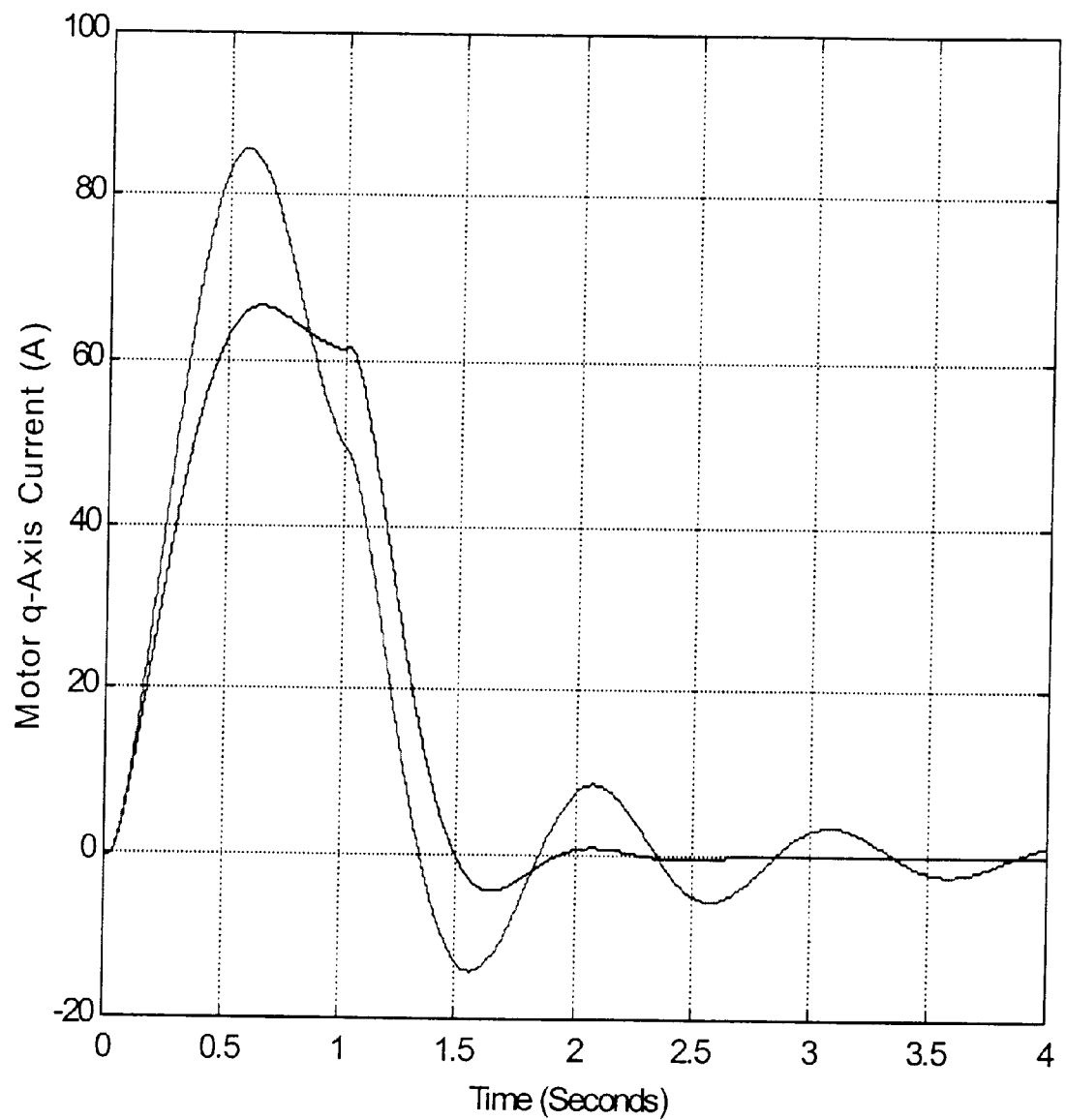
FIG. 5C shows superimposed graphs of quadrature axis motor current ($i_q$) response to a 1.0 second duration handwheel torque pulse with and without yaw and lateral acceleration feedback.

The vehicle is initially at steady-state conditions. FIGS. 5A–5C depict the responses of the system to the simulation. At time t=0.0 the steering wheel torque steps to 4.0 Nm. The handwheel torque remains constant at 4.0 Nm for one second. At time t=1.0 the handwheel torque returns to zero which is equivalent to the driver removing contact with the handwheel. The resulting transient in lateral velocity and yaw rate is indicative of the vehicle handling characteristics. The simulated responses with and without yaw and lateral acceleration feedback are shown in FIGS. 5A and 5B. It is observed that feedback increases damping and reduces the settling time in response to the steering transient. The associated motor current $i_q$, is shown in FIG. 5C. It is also noted that the use of feedback reduces the peak current during the steering transient.

The requirements of the Segment Lemma were implemented in computer simulation software using MATLAB®. The following parameter intervals were considered:

$R \epsilon [0.12, 0.20]$ $\lambda_m \epsilon [0.013, 0.018]$ $R \epsilon [0.60, 0.80]$ $C_f \epsilon [30000, 140000]$ $C_r \epsilon [30000, 140000]$ (26)

This range of parameters accounts for the change in motor resistance, magnet strength, and assist gear efficiency expected over vehicle operating temperature and life. The range of cornering coefficients corresponds to those encountered between wet and dry pavement conditions.

It was found by applying the Mapping Theorem and the Segment Lemma that the vehicle is robustly stable over the parameter uncertainty range given by the parameter intervals identified in (26).

Thus it can be seen that from these two methods of analysis that there can be identified intervals of variation for numerous system parameters where the vehicle-operator combined system may be stabilized by the addition of the yaw acceleration $\dot{r}$ and lateral acceleration $\dot{v}$ in a manner as described herein.

Figure 6:
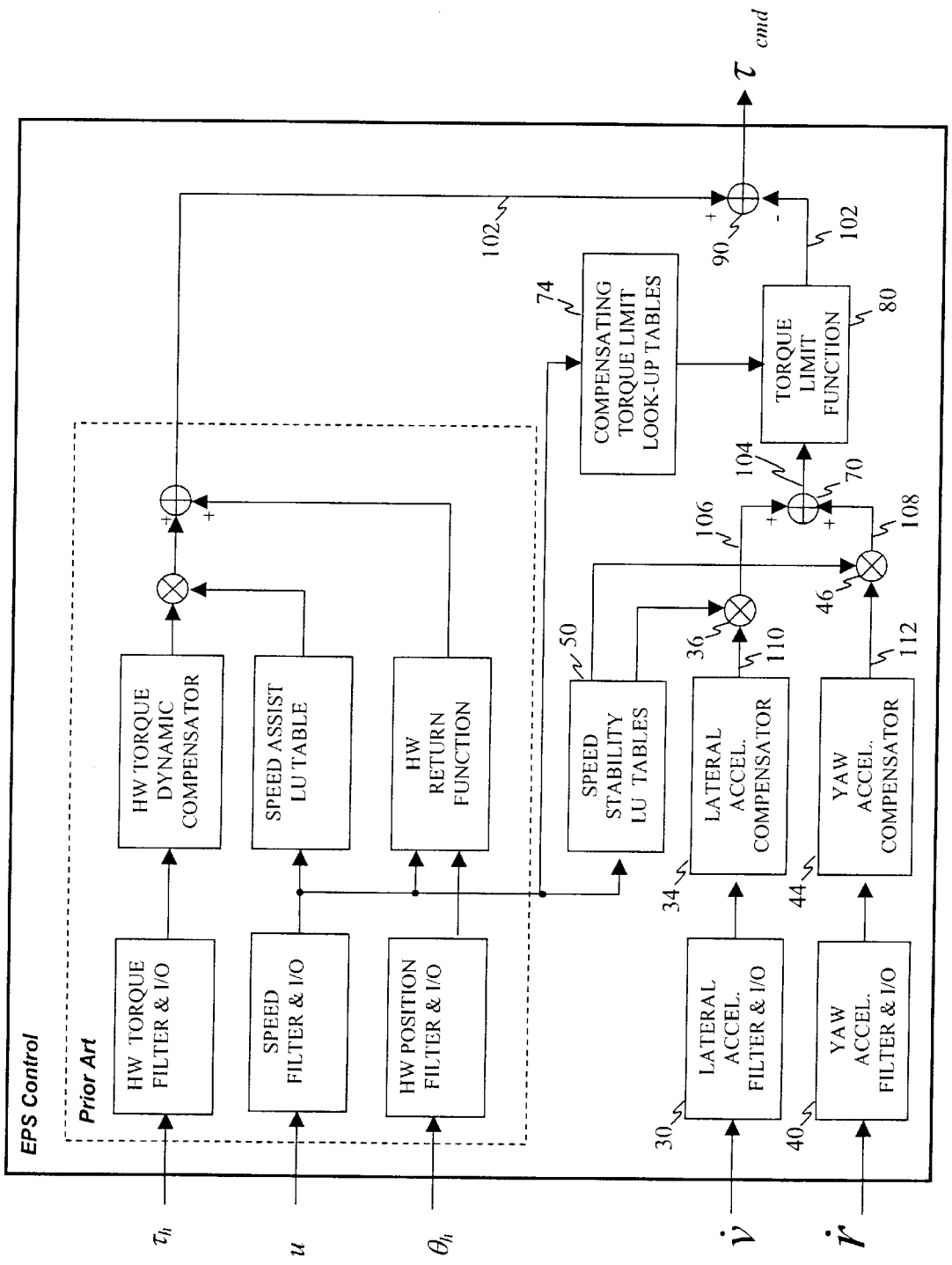
FIG. 6 depicts a block diagram of an EPS controller including an embodiment of the invention.

Returning now to FIG. 4 and also referring to FIG. 6, wherein the details of the controller 4 are depicted. FIG. 6 also depicts that portion of the controller discussed as prior art while also depicting the interrelation with the disclosed embodiment. As stated earlier, the controller 4 includes the interfaces and processing necessary to generate an assist torque command $\tau_{cmd}$, which includes a damping component responsive to an acceleration, in this case, the yaw acceleration $\dot{r}$ and lateral acceleration $\dot{v}$.

FIG. 6 depicts the processes performed for generation of the assist torque command $\tau_{cmd}$. As disclosed earlier, the assist torque command is generated in accordance with the basic functional formula $\tau \text{cmd} = f_1(u, \theta_h, \tau_h) + f_2(u, v, dv/dt, r, dr/dt)$ (27)

where u=vehicle speed, $\theta_h$=hand or steering wheel position, $\tau_h$=hand or steering wheel torque, v=lateral velocity, dv/dt= $\dot{v}$=lateral acceleration, r=yaw rate, and dr/dt=$\dot{r}$=yaw acceleration. It is noteworthy to recognize that $f_1$ represents the contribution to the $\tau_{cmd}$ associated with generating the desired assist torque command 100 (not a subject of this disclosure). Likewise, $f_2$ represents the contribution to the $\tau_{cmd}$ associated with generating the stabilizing compensating torque command 102. These two components are combined at summer 90 to generate the assist torque command $\tau_{cmd}$.

The generation of the stabilizing, compensating torque command 102 is depicted in FIG. 6. A first acceleration signal hereinafter the yaw acceleration $\dot{r}$ is received by controller 4 for processing at 40. Similarly, a second acceleration signal, lateral acceleration $\dot{v}$ is received by the controller 4 for processing at 30. Typically processing as may be employed for all signals may include but not be limited to input filtering for bandwidth limiting or frequency rejection, anti-alias filtering, and analog to digital conversion. Such processing as disclosed is only illustrative, as it will be appreciated that numerous variations may be provided for the purposes of signal generation, acquisition, capture, and processing.

It is now important to consider the compensation of the acquired and filtered first acceleration signal and second acceleration signal. A frequency based compensator is employed to modify and shape the spectral content of the acceleration signal yielding a compensated acceleration signal. As shown in FIG. 6, the lateral acceleration and yaw acceleration signals are compensated at processes 34 and 44 respectively. The lateral acceleration signal is applied to a frequency based lateral acceleration compensator 34 for modification and shaping of the spectral content of the signal yielding a compensated lateral acceleration signal 110. Similarly, the yaw acceleration signal is applied to a frequency based yaw acceleration compensator 44 for modification and shaping of the spectral content of the signal yielding a compensated yaw acceleration signal 112.

The compensator is a signal-processing element that operates on the accelerometer signal and computes the feedback characteristics for modifying the assist torque provided by the EPS system. In an embodiment, a band-pass transfer function characteristic is employed, which may be implemented with a number of various filtering techniques (e.g., Butterworth, Chebyshev, etc.). Commonly, it is convenient to normalize the output of the compensator to have a unity gain at its center frequency and to scale the results to an appropriate level as required by implementation, at a subsequent stage. In many cases a second order filter of the general form $$G(z) = \frac{b_0 + b_1 z^{-1} + b_2 z^{-2}}{a_0 + a_1 z^{-1} + a_2 z^{-2}}$$ (28)

is sufficient for compensation. Such a filter configuration as depicted by the general transfer function identified in equation (28) allow significant flexibility in the compensation configuration. In the embodiment disclosed, the filter coefficients $a_0$, $a_1$, $a_2$, $b_0$, $b_1$, and $b_2$ are designed and selected to have a band-pass characteristic similar to those depicted in FIG. 9.

Figure 9:
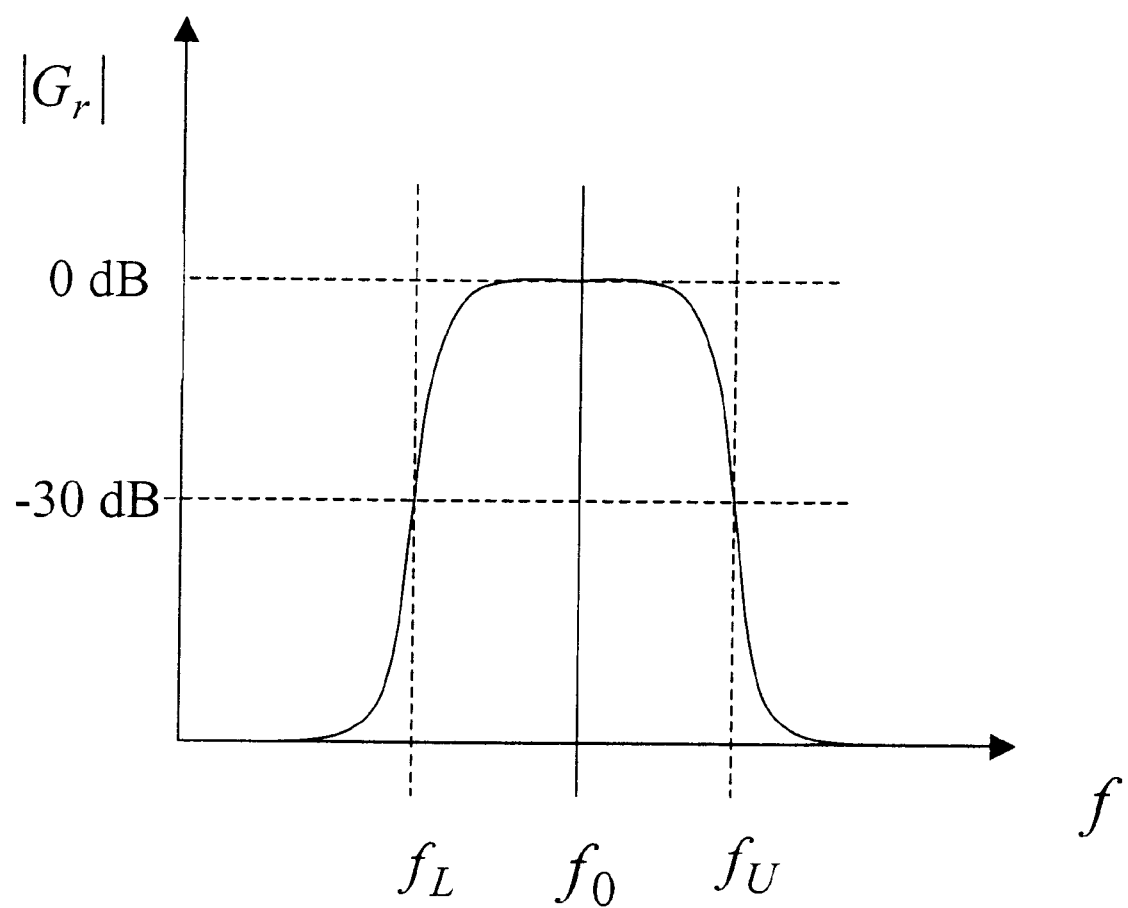
FIG. 9 depicts the frequency response of a compensator of an embodiment.

Referring to FIG. 9, the lower threshold of the stop band $f_L$ is designed to match the upper frequency for which a given vehicle should be operated given the anticipated range of road conditions and driver styles that may be encountered. This may be ascertained using the linearized vehicle dynamic models previously discussed. The midpoint frequency of the pass band $f_0$ corresponds to the natural frequency modes of the vehicle, for example, typically for the range of vehicle dynamic parameters previously discussed:

1. The lateral direction mode is primarily determined by vehicle mass and tire stiffness on dry pavement.
2. The yaw rotation mode is primarily determined by the moment of inertia of the vehicle about the yaw axis and tire stiffness on dry pavement.

The upper band stop $f_U$ is designed to reject noise inputs such as may be generated from road surface conditions (potholes, pavement joints, etc.) or electrical interference thereby avoiding response to these type disturbances or inputs. It will be appreciated that different vehicles exhibit a variety of characteristics and therefore, the exact placement for the filter pas band, lower threshold of the stop band and upper threshold of the stop band may vary from one vehicle to the next. Further, the types of handling characteristics desired will also vary from one vehicle to the next. One skilled in the art would appreciate the that the various filter parameters would be selected based upon the particular vehicle under consideration.

In an embodiment, for a typical large sedan, the coefficients for the yaw acceleration compensator are selected to place the lower threshold of the stop band $f_L$ at about 0.15 Hz., the midpoint frequency of the pass band $f_0$ at about 1.5 Hz., and the upper band stop $f_U$ at about 15 Hz. Similarly, the coefficients for the lateral acceleration compensator are selected to place the lower threshold of the stop band $f_L$ at about 0.25 Hz., the midpoint frequency of the pass band $f_o$ at about 1.25 Hz., and the upper band stop $f_U$ at about 6.25 Hz.

The compensator characteristics are selected to ensure the stability of the system over a wide range of parameter variations. Referencing the eigenvalue analysis considered earlier, the filter break points are placed specifically to address the natural frequencies associated with the complex conjugate roots that approach instability as the system parameters vary. For example, from equation (14), the last two pairs of eigenvalues would cause the system to become unstable as system parameters vary. However, application of the feedback including tuning of the feedback to address the desired spectral conditions and responses yields a system that remains stable (as depicted by the eigenvalues of equation (15)).

It will also be appreciated that although the previous discussion of the compensator was provided in terms of a band pass type filter, analogous considerations may be made to using well known control system tuning techniques such as proportional-integral-derivative PID controls. In fact, employing PID control and tuning concepts the same or very similar spectral shaping may readily be achieved.

Returning once again to FIG. 6 to consider the processing performed at vehicle speed stability block 50. The processing performed at this block generates a scaling factor for scheduling or adjusting the output of the lateral and yaw acceleration compensators 34, 44 as a function of vehicle speed. Vehicle speed scheduling accounts for nonlinear characteristics of the vehicle dynamics with respect to vehicle speed. The vehicle speed indexes the look up table 50 generating an acceleration scale factor. As depicted, both a lateral acceleration scale factor and yaw acceleration scale factor are generated, however just one scale factor or more could be utilized. For example, in an embodiment, two scale factors are used allowing unique scaling for each of the compensated accelerations, but if equal scaling were acceptable a single scale factor would suffice. The compensated acceleration signal is scheduled by the scale factor in a multiplier generating a feedback signal. FIG. 6 depicts the compensated lateral acceleration signal 110 and compensated yaw acceleration signal 112, each being scheduled by the corresponding scaling factors at multipliers 36 and 46 respectively, thereby generating a lateral feedback signal 106 and a yaw feedback signal 108. In an embodiment of the invention, such scheduling may be a multiplication as described. However, other methods, processes, and algorithms for scheduling of compensated lateral acceleration signal 110 and compensated yaw acceleration signal 112 are feasible, for example, multiplication, modulation, interpolation, extrapolation, or other similar combination methods. The velocity dependent scaling causes the lateral and yaw feedback signals 106, 108 to correspond to the primary torque path gains and to adjust the level to which the steering assist function is impacted. Vehicle speed scheduling namely reduces the magnitude of the assist provided to an operator as vehicle speed increases. The look-up table functions typically are as depicted in FIGS. 10A and 10B respectively.

Figure 10A:
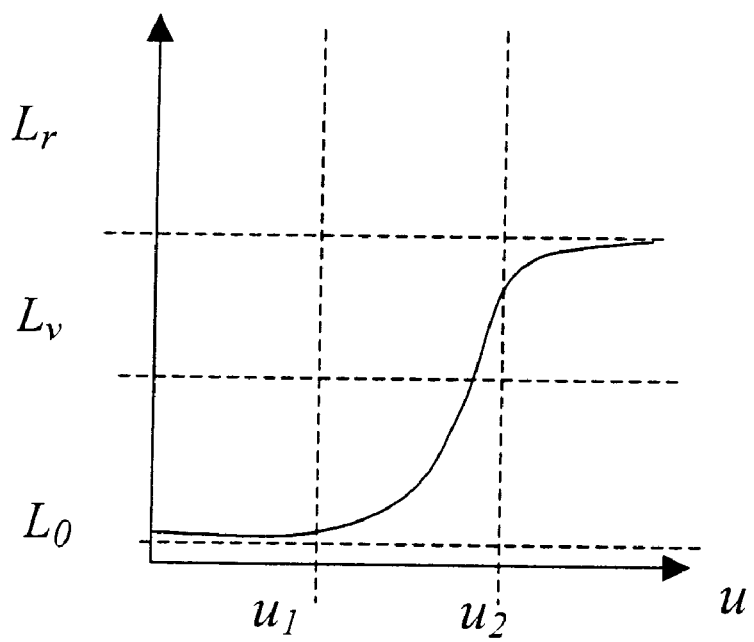
FIG. 10A depicts the lateral acceleration look up table.
Figure 10B:
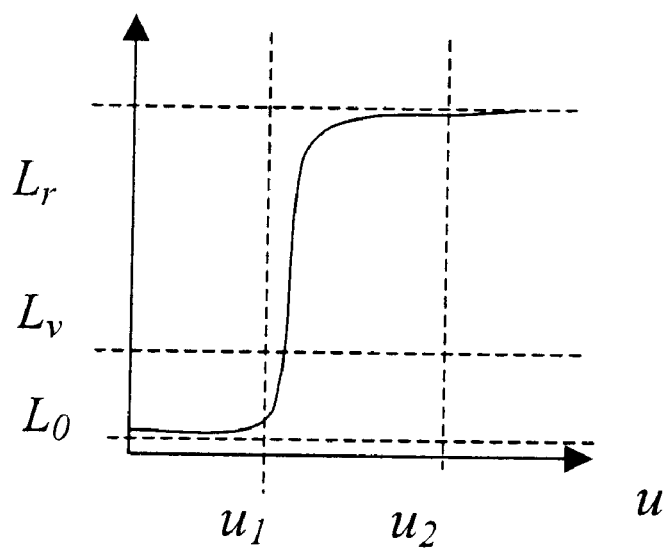
FIG. 10B depicts the yaw acceleration look up table.

In the two FIGS. 10A, 10B, the values $L_r$ and $L_v$ are the yaw and lateral scaling gains, respectively, which provide for the level to which the respective signals may be included in the compensation. Generally, yaw feedback may be more heavily weighted than lateral acceleration feedback as the stabilization of the vehicle is responsive to the yaw feedback and thus provides a greater stabilizing effect. The values $u_1$ and $u_2$ each identify vehicle speed transition points for the scaling gains of the look up tables. In an embodiment of the invention, the lower speed transition point may typically be set to about 8 to 12 km/hr corresponding to typical parking maneuvers. Similarly, the upper speed transition point is typically about 50 to 60 km/hr corresponding to a transition to moderate urban roadway conditions. The gain level $L_0$ identifies the minimum level of scaling, and therefore compensation, which occurs at very low vehicle speeds.

It will be appreciated that while the disclosed embodiments refer in several instances, to a configuration utilizing look-up tables in implementation, such a reference is illustrative only and not limiting, various alternatives will be apparent to those skilled in the art. For example, the processes described above could employ in addition to or in lieu of look-up tables direct algorithms, gain or parameter scheduling, linearized interpolation or extrapolation, or various other methodologies, which may facilitate execution of the desired functions.

Returning once again to FIG. 6, summer 70 combines the lateral feedback signal 106 and the yaw feedback signal 108 to generate a composite compensation signal 104. In an embodiment, the combination disclosed is a simple summation, however, it will be appreciated that the combination may be more sophisticated and could in fact include additional sensor information or parameters. Furthermore, the combination may not be utilized at all in a case where a single acceleration is employed. In an embodiment of the invention, the combination in conjunction with the scheduling may indicate a varying percentage of combination between the two accelerations. While this combination has been shown, it is evident that numerous ratios of combinations are conceivable, from no contribution to a full contribution from either signal. Looking once again to the composite compensation signal 104 representing the combined yaw and lateral acceleration feedback is applied to the compensating torque limit function identified by block 80. The compensating torque limit function 80 provides for limiting the amount of compensating torque command 102 that is generated as a function of vehicle speed. The compensating torque limit function 80 provides a self-checking diagnostic function to prevent erroneous compensating torque commands from being passed to the assist mechanism 2 due to fault conditions in the sensors or algorithm execution. In an embodiment, the compensating torque look-up table 74 generally limits the compensating torque magnitude to decreasing values as the vehicle speed increases thereby, ensuring that the tactile feedback to the operator increases.

As stated earlier, the compensating torque command 102 is combined at summer 90 with the desired assist torque command 100 thereby generating the assist torque command $\tau_{cmd}$ identified by equation (27). It is noted that the compensating torque command 102 is subtracted from the desired assist torque command 100 at summer 90, this simply indicates that for a given condition, the compensating torque command "reduces" the amount of assist which would otherwise have been provided. A reduction in the assist torque to the operator provides additional tactile feedback force to the operator and therefore reduces the likelihood that the operator would unintentionally inject additional destabilizing inputs.

It will be appreciated the embodiments as disclosed to this point refer to and employ both yaw and lateral feedback to achieve the desired stabilization of the human-vehicle system. However, it will be further appreciated that stabilization may be realized employing either yaw or lateral feedback alone. It should be understood that such an embodiment may likely require differences in the specific control topology (e.g., example the compensators 34, 44), however, such differences should be understood as within the scope of the invention and the claims. For example, to employ yaw feedback alone, the yaw acceleration compensator 44 may be characterized differently to account for system responses that were previously better addressed by the lateral feedback. Likewise, the vehicle speed scheduling may also be modified to account for such differences or other vehicle characteristics. Finally, the combination at summer 70 would be unnecessary if only a single channel of feedback sensor is employed.

Figure 7:
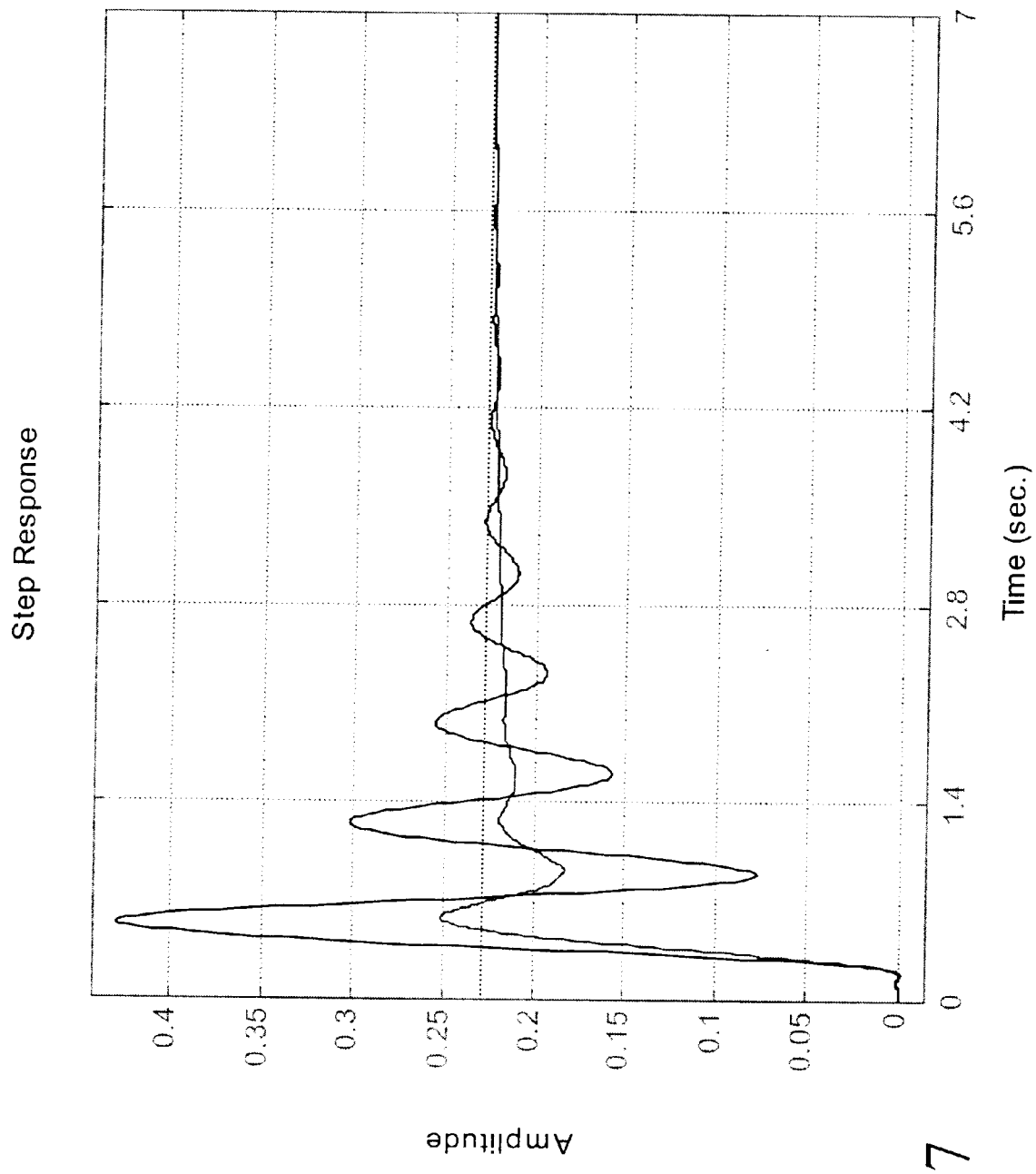
FIG. 7 shows superimposed graphs of lateral velocity response to a step input of lateral velocity with and without feedback.

For further illumination and to illustrate the advantages provided by utilization of the methods disclosed herein, time responses of a steering maneuver are simulated using with a system model using MATLAB/SIMULINK®. The driver-vehicle system parameters are selected to represent low road surface friction coefficient conditions. The response to a lateral velocity step input is shown in FIG. 7. The step response without yaw rate feedback results in large oscillations of the lateral velocity. In this case, the linear model is no longer valid because these conditions would induce nonlinear psychological and physiological reactions in the driver. The limitation of the model is that the human operator responds proportionally sensory inputs. However, as the vehicle response becomes increasingly erratic the human behavior becomes less predictable. In addition, the pneumatic tire forces enter a nonlinear regime. In practice, this would result in a loss of vehicle control. For the subsequent analysis, it should be noted that the driver-vehicle system model remains valid if the vehicle response is kept from becoming highly oscillatory.

Figure 8:
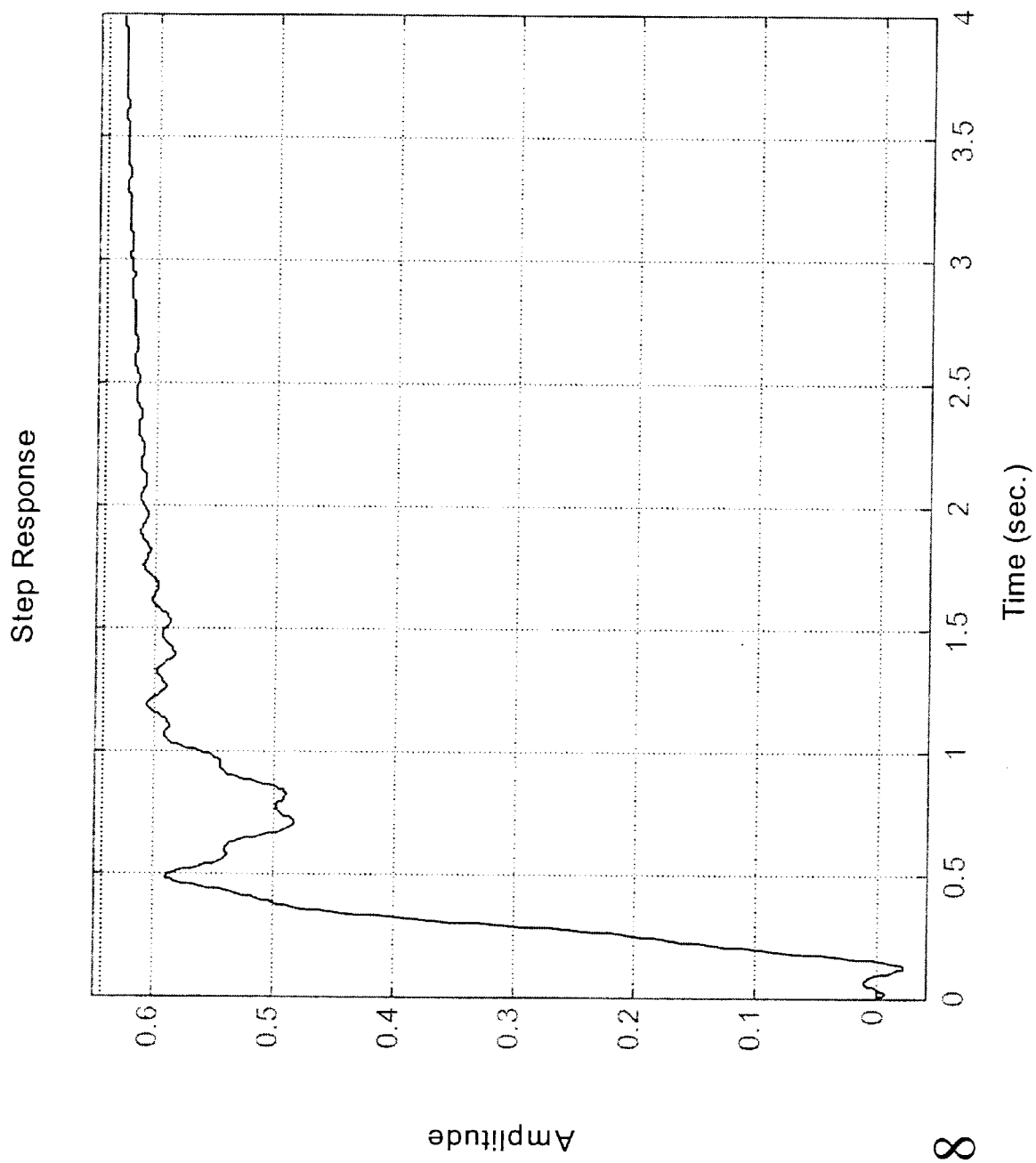
FIG. 8 shows superimposed graphs of yaw rate response to a step input of lateral velocity with and without feedback.

When yaw rate feedback is included, it is observed that the lateral velocity step response is well behaved and has minimal overshoot. Therefore, active control of the assist torque improves the stability of the driver-vehicle system. The improved vehicle stability may be attributed to increased tactile feedback to the driver and increased rack transmissibility (less assist equates to greater forces) to the hand wheel. The reduction in assist torque and additional tactile feedback result in a driver-vehicle system where the driver is less likely to over react to a disturbance condition. FIG. 8 shows the compensating torque for the transient plotted in FIG. 7. The degree of tactile feedback increases as the assist torque gain is reduced. Therefore, there is an increased level of tactile feedback during the steering transient since the effect of the compensator is to reduce the amount of assist torque during the steering transient. Moreover, the enhanced stability may also be accredited to the increased transmissibility of rack loads to the steering wheel by the compensator for maneuvers that induce large yaw rate variations.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 20, wherein, when the computer program code is loaded into and executed by a computer, the computer becomes an apparatus for practicing the invention. The present invention can also be embodied in the form of computer program code, for example, whether stored in a storage medium 20, loaded into and/or executed by a computer, or as data signal 22 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A stabilizing system for a vehicle employing an electric power steering system which generates a desired torque command, the system comprising:

a vehicle speed sensor, wherein said vehicle speed sensor measures a vehicle speed and transmits a vehicle speed signal representative of said vehicle speed;

an assist mechanism configured apply an assist torque to said electric power steering system, wherein said assist torque is responsive to an assist torque command;

an acceleration sensor, wherein said acceleration sensor measures vehicle acceleration and transmits an acceleration signal representative of said vehicle acceleration;

a controller configured to receive signals including: a steering wheel torque signal from a torque sensor; a steering wheel position signal from a steering wheel position sensor; said vehicle speed signal from said vehicle speed sensor; said acceleration signal from said acceleration sensor;

said controller further configured to generate said assist torque command comprising a combination of said desired torque command with a compensating torque command; and wherein said acceleration sensor measures vehicle yaw acceleration and transmits a yaw acceleration signal.

2. The electric power steering system of claim 1 further including a second acceleration sensor, which measures a second vehicle acceleration.

3. The electric power steering system of claim 2 wherein:

said second acceleration sensor generates a second acceleration signal representative of said second vehicle acceleration;

said second acceleration signal is a lateral acceleration signal representative of vehicle lateral acceleration; and said compensating torque command is responsive to said vehicle speed signal, said yaw acceleration, and said lateral acceleration signal.

4. A stabilizing system for a vehicle employing an electric power steering system which generates a desired torque command, the system comprising:

a vehicle speed sensor, wherein said vehicle speed sensor measures a vehicle speed and transmits a vehicle speed signal representative of said vehicle speed;

an assist mechanism configured apply an assist torque to said electric power steering system, wherein said assist torque is responsive to an assist torque command;

an acceleration sensor, wherein said acceleration sensor measures vehicle acceleration and transmits an acceleration signal representative of said vehicle acceleration;

a controller configured to receive signals including: a steering wheel torque signal from a torque sensor; a steering wheel position signal from a steering wheel position sensor; said vehicle speed signal from said vehicle speed sensor; said acceleration signal from said acceleration sensor;

said controller further configured to generate said assist torque command comprising a combination of said desired torque command with a compensating torque command;

wherein said acceleration sensor measures vehicle yaw acceleration and transmits a yaw acceleration signal; and wherein said compensating torque command is the resultant of frequency based compensation applied via a yaw acceleration compensator to said yaw acceleration signal.

5. The electric power steering system of claim 4 wherein said yaw acceleration compensator modifies and shapes the spectral content of said yaw acceleration signal to maintain the stability of said vehicle.

6. The electric power steering system of claim 5 wherein said yaw acceleration compensator is characterized by a second order band pass filter arrangement with a pass band between about 0.15 Hz and about 15.0 Hz.

7. A stabilizing system for a vehicle employing an electric power steering system which generates a desired torque command, the system comprising:

a vehicle speed sensor, wherein said vehicle speed sensor measures a vehicle speed and transmits a vehicle speed signal representative of said vehicle speed;

an assist mechanism configured apply an assist torque to said electric power steering system, wherein said torque is responsive to an assist torque command;

an acceleration sensor, wherein said acceleration sensor measures vehicle acceleration and transmits an acceleration signal representative of said vehicle acceleration;

a controller configured to receive signals including: a steering wheel torque signal from a torque sensor; a steering wheel position signal from a steering wheel position sensor; said vehicle speed signal from said vehicle speed sensor; said acceleration signal from said acceleration sensor;

said controller further configured to generate said assist torque command comprising a combination of said desired torque command with a compensating torque command;

wherein said acceleration signal is a lateral acceleration signal; and wherein said compensating torque command is the resultant of frequency based compensation applied via a lateral acceleration compensator to said lateral acceleration signal.

8. The electric power steering system of claim 7 wherein said lateral acceleration compensator modifies the spectral content of said lateral acceleration signal to maintain the stability of said electric power steering system.

9. The electric power steering system of claim 8 wherein said lateral acceleration compensator is characterized by a second order band pass filter arrangement with a pass band between about 0.25 Hz and about 6.25 Hz.

10. A stabilizing system for a vehicle employing an electric power steering system which generates a desired torque command, the system comprising:

a vehicle speed sensor, wherein said vehicle speed sensor measures a vehicle speed and transmits a vehicle speed signal representative of said vehicle speed;

an assist mechanism configured apply an assist torque to said electric power steering system, wherein said assist torque is responsive to an assist torque command;

an acceleration sensor, wherein said acceleration sensor measures vehicle acceleration and transmits an acceleration signal representative of said vehicle acceleration;

a controller configured to receive signals including: a steering wheel torque signal from a torque sensor; a steering wheel position signal from a steering wheel position sensor; said vehicle speed signal from said vehicle speed sensor; said acceleration signal from said acceleration sensor;

said controller further configured to generate said assist torque command comprising a combination of said desired torque command with a compensating torque command; and wherein said compensating torque command is characterized by a scheduling of an acceleration scale factor which is the resultant of a speed stability look up table indexed by vehicle speed.

11. A stabilizing system for a vehicle employing an electric power steering system which generates a desired torque command, the system comprising:

a vehicle speed sensor, wherein said vehicle speed sensor measures a vehicle speed and transmits a vehicle speed signal representative of said vehicle speed;

an assist mechanism configured apply an assist torque to said electric power steering system, wherein said assist torque is responsive to an assist torque command;

an acceleration sensor, wherein said acceleration sensor measures vehicle acceleration and transmits an acceleration signal representative of said vehicle acceleration;

a controller configured to receive signals including: a steering wheel torque signal from a torque sensor; a steering wheel position signal from a steering wheel position sensor; said vehicle speed signal from said vehicle speed sensor; said acceleration signal from said acceleration sensor;

said controller further configured to generate said assist torque command comprising a combination of said desired torque command with a compensating torque command;

wherein said compensating torque command is the resultant of application of a compensating torque limit function to a composite feedback signal; and said compensating torque limit function is responsive to limiting established by a compensating torque limit look up table which is indexed by vehicle speed to generate a limit value for said compensating torque limit function.

12. The electric power steering system of claim 11 wherein said compensating torque limit function limits the compensating torque command magnitude to decreasing values of said composite feedback signal as said vehicle speed increases.

13. The electric power steering system of claim 11 wherein said composite feedback signal is generated as a result of a combination of one or more feed back signals.

14. The electric power steering system of claim 13 wherein said one or more feed back signals includes a yaw feed back signal and a lateral feed back signal.

15. The electric power steering system of claim 13 wherein said one or more feed back signals is characterized by the scheduling of a compensated acceleration signal by an acceleration scale factor.

16. The electric power steering system of claim 15 wherein said acceleration scale factor is the resultant of a speed stability look up table indexed by vehicle speed.

17. The electric power steering system of claim 15 wherein said compensated acceleration signal is the resultant of frequency based compensation applied via an acceleration compensator to said acceleration signal.

18. The electric power steering system of claim 17 wherein said acceleration compensator modifies the spectral content of said acceleration signal to maintain the stability of said electric power steering system.

19. The electric power steering system of claim 18 wherein said acceleration compensator is characterized by a second order band pass filter.

20. A method of stabilizing a vehicle employing an electric power steering system comprising:
  receiving a desired torque command representative of a steering wheel torque desired in said electric power steering system;
  receiving a vehicle speed signal representative of a forward speed of said vehicle;
  acquiring an acceleration signal representative of vehicle acceleration;
  generating an assist torque command comprising a combination of desired torque command with a compensating torque command;
  applying said assist torque command to an assist mechanism;
  wherein said acceleration signal is generated by an acceleration sensor that measures said vehicle acceleration and transmit said acceleration signal;
    wherein said compensating torque command is responsive to said vehicle speed signal and said acceleration signal; and
    wherein said acceleration signal is a yaw acceleration signal.

21. The method of claim 20 further including acquiring a second acceleration signal representative of a second vehicle acceleration.

22. The method of claim 21 wherein:
  said second acceleration signal is generated by a second acceleration sensor that measures said second vehicle acceleration;
  said second acceleration signal is a lateral acceleration signal representative of vehicle lateral acceleration; and
  wherein said compensating torque command is responsive to said vehicle speed signal, said yaw acceleration, and said lateral acceleration signal.

23. A method of stabilizing a vehicle employing an electric power steering system comprising:
  receiving a desired torque command representative of a steering wheel torque desired in said electric power steering power;
  receiving a vehicle speed signal representative of a forward speed of said vehicle;
  acquiring an acceleration signal representative of vehicle acceleration;
  generating an assist torque command comprising a combination of said desired torque command with a compensating torque command;
  applying said assist torque command to an assist mechanism;
  wherein said acceleration signal is generated by an acceleration sensor that measures said vehicle acceleration and transmit said acceleration signal;
  wherein said compensating torque command is responsive to said vehicle speed signal and said acceleration signal;
  wherein said acceleration signal is a yaw acceleration signal; and
  wherein said compensating torque command is the resultant of frequency based compensation applied via a yaw acceleration compensator to said yaw acceleration signal.

24. The method of claim 23 wherein said yaw acceleration compensator modifies and shapes the spectral content of said yaw acceleration signal to maintain the stability of said vehicle.

25. The method of claim 24 wherein said yaw acceleration compensator is characterized by a second order band pass filter arrangement with a pass band between about 0.15 Hz and about 15.0 Hz.

26. A method of stabilizing a vehicle employing an electric power steering system comprising:
  receiving a desired torque command representative of a steering wheel torque desired in said electric power steering system;
  receiving a vehicle speed signal representative of a forward speed of said vehicle;
  acquiring an acceleration signal representative of vehicle acceleration;
  generating an assist torque command comprising a combination of said desired torque command with a compensating torque command;
  applying said assist torque command to an assist mechanism;
  wherein said acceleration signal is generated by an acceleration sensor that measures said vehicle acceleration and transmit said acceleration signal;
  wherein said compensating torque command is responsive to said vehicle speed signal and said acceleration signal;
  wherein said acceleration signal is a lateral acceleration signal; and
  wherein said compensating torque command is the resultant of frequency based compensation applied via a lateral acceleration compensator to said lateral acceleration signal.

27. The method of claim 26 wherein said lateral acceleration compensator modifies the spectral content of said lateral acceleration signal to maintain the stability of said vehicle.

28. The method of claim 27 wherein said lateral acceleration compensator is characterized by a second order band pass filter arrangement with a pass band between about 0.25 Hz. and about 6.25 Hz.

29. A method of stabilizing a vehicle employing an electric power steering system comprising:

receiving a desired torque command representative of a steering wheel torque desired in said electric power steering system;

receiving a vehicle speed signal representative of a forward speed of said vehicle;

acquiring an acceleration signal representative of vehicle acceleration;

generating an assist torque command comprising a combination of said desired torque command with a compensating torque command;

applying said assist torque command to an assist mechanism;

wherein said acceleration signal is generated by an acceleration sensor that measures said vehicle acceleration and transmit said acceleration signal;

wherein said compensating torque command is responsive to said vehicle speed signal and said acceleration signal; and wherein said compensating torque command is characterized by the scheduling of said acceleration signal by acceleration scale factor which is the resultant of a speed stability look up table indexed by vehicle speed.

30. A method of stabilizing a vehicle employing an electric power steering system comprising:

receiving a desired torque command representative of a steering wheel torque desired in said electric power steering system;

receiving a vehicle speed signal representative of a forward speed of said vehicle;

acquiring an acceleration signal representative of vehicle acceleration;

generating an assist torque command comprising a combination of said desired torque command with a compensating torque command;

applying said assist torque command to an assist mechanism;

wherein said acceleration signal is generated by an acceleration sensor that measures said vehicle acceleration and transmit said acceleration signal;

wherein said compensating torque command is responsive to said vehicle speed signal and said acceleration signal; and wherein said compensating torque command is the resultant of application of a compensating torque limit function to a composite feedback signal; and said compensating torque limit function is responsive to limiting established by a compensating torque limit look up table which is indexed by vehicle speed to generate a limit value for said compensating torque limit function.

31. The method of claim 30 wherein said compensating torque limit function limits the compensating torque command magnitude to decreasing values of said composite feedback signal as said vehicle speed increases.

32. The method of claim 30 wherein said composite feedback signal is generated as a result of a combination of one or more feed back signals.

33. The method of claim 32 wherein said one or more feed back signals includes a yaw feed back signal and lateral feed back signal.

34. The method of claim 32 wherein said one or more feed back signals is characterized by the scheduling of a compensated acceleration signal by an acceleration scale factor.

35. The method of claim 34 wherein said acceleration scale factor is the resultant of a speed stability look up table indexed by vehicle speed.

36. The method of claim 34 wherein said compensated acceleration signal is the resultant of frequency based compensation applied via an acceleration compensator to said acceleration signal.

37. The method of claim 36 wherein said acceleration compensator modifies the spectral content of said acceleration signal to maintain the stability of said electric power steering system.

38. The method of claim 37 wherein said acceleration compensator is characterized by a second order band pass filter.

39. A storage medium encoded with a machine-readable computer program code for stabilizing a vehicle employing an electric power steering system said storage medium including instruction for causing a computer to implement a method comprising:

receiving a desired torque command representative of a steering wheel torque desired in said electric power steering system;

receiving a vehicle speed signal representative of a forward speed of said vehicle;

acquiring an acceleration signal representative of vehicle acceleration;

generating an assist torque command comprising a combination of said desired torque command with a compensating torque command;

applying said assist torque command to an assist mechanism;

wherein said acceleration signal is generated by an acceleration sensor that measures said vehicle acceleration and transmit said acceleration signal;

wherein said compensating torque command is responsive to said vehicle speed signal and said acceleration signal; and wherein said compensating torque command is the resultant of application of a compensating torque limit function to a composite feedback signal; and said compensating torque limit function is responsive to limiting established by a compensating torque limit look up table which is indexed by vehicle speed to generate a limit value for said compensating torque limit function.

40. A computer data signal for stabilizing a vehicle employing an electric power steering system said computer data signal comprising code for causing a computer to implement a method comprising:

receiving a desired torque command representative of a steering wheel torque desired in said electric power steering system;

receiving a vehicle speed signal representative of a forward speed of said vehicle;

acquiring an acceleration signal representative of vehicle acceleration;

generating an assist torque command comprising a combination of said desired torque command with a compensating torque command;

applying said assist torque command to assist mechanism;

wherein said acceleration signal is generated by an acceleration sensor that measures said vehicle acceleration and transmit said acceleration signal;

wherein said compensating torque command is responsive to said vehicle speed signal and said acceleration signal; and wherein said compensating torque command is the resultant of application of a compensating torque limit function to a composite feedback signal; and said compensating torque limit function is responsive to limiting established by a compensating torque limit look up table which is indexed by vehicle speed to generate a limit value for said compensating torque limit function.

* * * * *